(12) United States Patent
Wieder et al.

(10) Patent No.: US 11,645,141 B2
(45) Date of Patent: May 9, 2023

(54) AUTOMATED ROOT-CAUSE ANALYSIS FOR DISTRIBUTED SYSTEMS USING TRACING-DATA

(71) Applicant: HUAWEI CLOUD COMPUTING TECHNOLOGIES CO., LTD., Gui'an New District (CN)

(72) Inventors: Alexander Wieder, Munich (DE); Jorge Cardoso, Munich (DE); Ilya Shakhat, Munich (DE)

(73) Assignee: Huawei Cloud Computing Technologies Co., Ltd., Gui'an New District (CN)

(*) Notice: Subject to any disclaimer, the term of this patent is extended or adjusted under 35 U.S.C. 154(b) by 95 days.

(21) Appl. No.: 17/462,955

(22) Filed: Aug. 31, 2021

(65) Prior Publication Data

US 2021/0397500 A1 Dec. 23, 2021

Related U.S. Application Data

(63) Continuation of application No. PCT/EP2019/055299, filed on Mar. 4, 2019.

(51) Int. Cl.
*G06F 11/07* (2006.01)
*G06F 16/901* (2019.01)
*G06F 11/34* (2006.01)

(52) U.S. Cl.
CPC ........ *G06F 11/079* (2013.01); *G06F 11/3466* (2013.01); *G06F 16/9024* (2019.01)

(58) Field of Classification Search
CPC . G06F 11/079; G06F 11/3466; G06F 16/9024
See application file for complete search history.

(56) References Cited

U.S. PATENT DOCUMENTS 7,877,642 B2 * 1/2011 Ding ............... G06F 16/23
717/133
10,452,515 B2 * 10/2019 Mietke ............ G06F 11/079
(Continued)

FOREIGN PATENT DOCUMENTS

WO 2018145743 A1 8/2018

OTHER PUBLICATIONS

Mi et al., "Localizing root causes of performance anomalies in cloud computing systems by analyzing request trace logs," Science China Information Sciences, vol. 55, No. 12, pp. 2757-2773, Science China Press and Springer-Verlag Berlin Heidelberg (Dec. 2012).
(Continued)

*Primary Examiner* — Nadeem Iqbal
(74) *Attorney, Agent, or Firm* — Leydig, Voit & Mayer, Ltd.

(57) ABSTRACT

A system for identifying root cause of anomalies in execution of an application comprising a plurality of operations is provided. The system comprising a preprocessing module configured to receive tracing data comprising a plurality of tracing spans each documenting, for a corresponding operation of the application, a plurality of properties and corresponding values, a signal splitting module configured to group the plurality of tracing spans in a plurality of groups such that each of the plurality of groups comprises operations with identical properties and corresponding values, an anomaly detection module configured to determine anomalous operations for each of the plurality of tracing data spans, a scoring module configured to calculate a plurality of anomaly scores each indicating a level of anomaly within each of the plurality of groups and a root cause identification module configured to analyze the anomaly scores and identify root cause of the detected anomalies according to the analysis.

16 Claims, 10 Drawing Sheets

(56) References Cited

U.S. PATENT DOCUMENTS

| | | |
|---|---|---|
| 2009/0183031 A1 | 7/2009 | Bethke et al. |
| 2011/0276836 A1 | 11/2011 | Kahana et al. |
| 2016/0162346 A1 | 6/2016 | Kushnir et al. |
| 2016/0203035 A1* | 7/2016 | Tran .................. G06F 11/079 714/37 |
| 2017/0242773 A1 | 8/2017 | Cirne et al. |

OTHER PUBLICATIONS

Akoglu et al., "Graph-based Anomaly Detection and Description: A Survey," arXiv:1404.4679v2 [cs.SI], pp. 1-68 (Apr. 28, 2014).

\* cited by examiner

PROPERTY VALUES ASSIGNMENTS

PROJECT = NOVA  ☐
PROJECT = KEYSTONE  ■
HOST = 10.1.1.50  ▨
HOST = 10.1.1.60  ▦

402

| # | MICROSERVICE | HOST | LATENCY (ms) |
|---|---|---|---|
| 1 | NOVA | 10.1.1.50 | 14 |
| 2 | NOVA | 10.1.1.50 | 16 |
| 3 | NOVA | 10.1.1.60 | 10 |
| 4 | KEYSTONE | 10.1.1.60 | 24 |
| 5 | NOVA | 10.1.1.50 | 19 |
| 6 | KEYSTONE | 10.1.1.50 | 22 |
| 7 | KEYSTONE | 10.1.1.60 | 28 |
| 8 | NOVA | 10.1.1.50 | 11 |
| 9 | KEYSTONE | 10.1.1.60 | 29 |
| 10 | NOVA | 10.1.1.60 | 10 |
| 11 | NOVA | 10.1.1.50 | 17 |
| 12 | NOVA | 10.1.1.60 | 10 |
| 13 | NOVA | 10.1.1.60 | 10 |
| 14 | KEYSTONE | 10.1.1.50 | 22 |
| 15 | KEYSTONE | 10.1.1.50 | 22 |

$S$:

$S$:

502 PREPROCESSING

504 SIGNAL SPLITTING

506 ANOMALY DETECTION

ANOMALY  ANOMALY  ANOMALY

508 SCORING  $R(S_{a_1})=0.0$  $R(S_{a_2})=0.333$  $R(S_{a_3})=1.0$  $R(S_{a_4})=0.333$

510 ROOT CAUSE IDENTIFICATION  PROBABLE ROOT CAUSE IS:

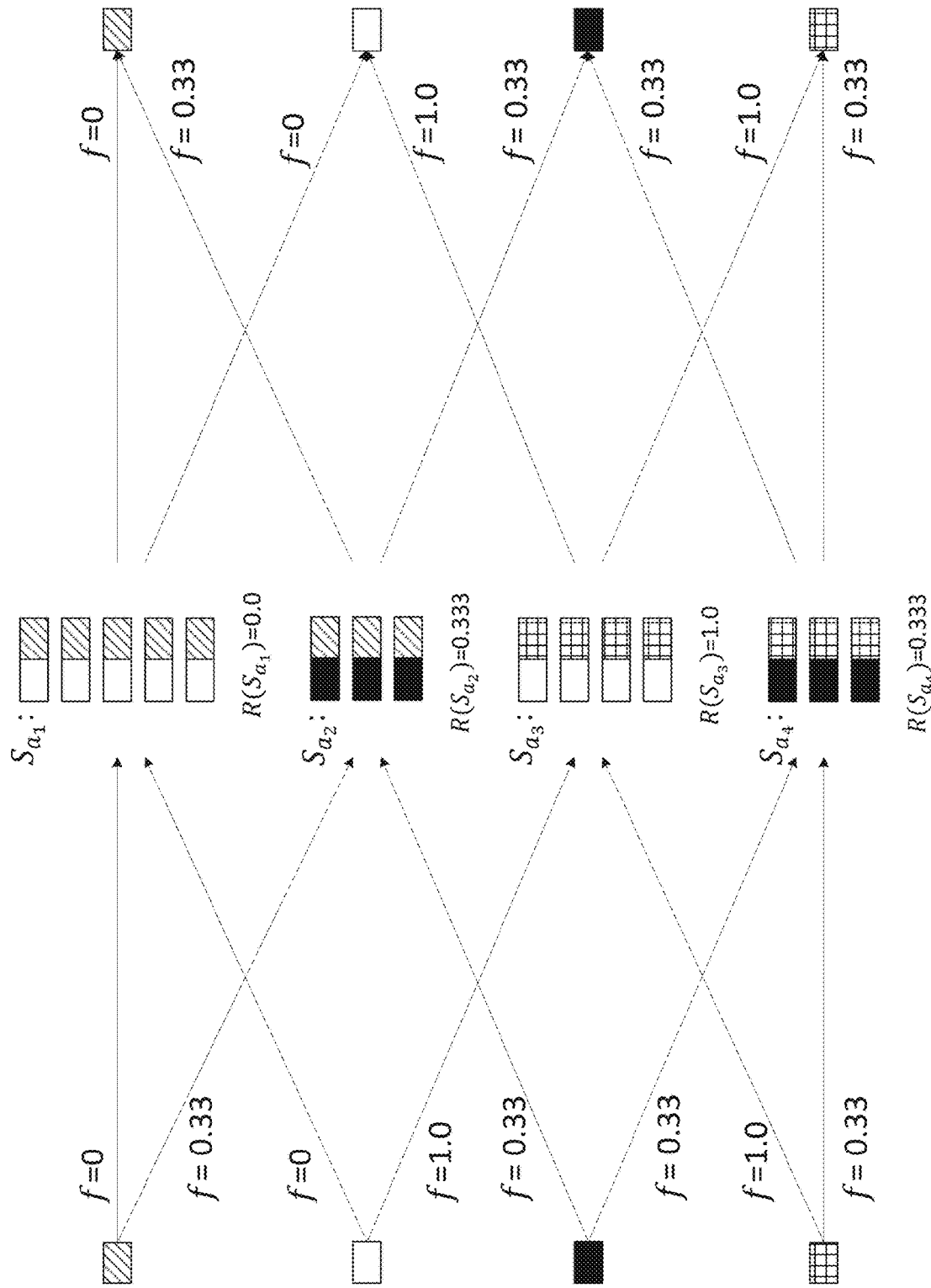

AUTOMATED ROOT-CAUSE ANALYSIS FOR DISTRIBUTED SYSTEMS USING TRACING-DATA

CROSS-REFERENCE TO RELATED APPLICATIONS

This application is a continuation of International Application No. PCT/EP2019/055299, filed on Mar. 4, 2019, the disclosure of which is hereby incorporated by reference in its entirety.

TECHNICAL FIELD

The present disclosure, in some embodiments thereof, relates to identifying a root cause of anomalies in an execution of an application and, more specifically, but not exclusively, to identifying a root cause of anomalies an execution of an application executed jointly by a plurality of computing nodes of a distributed system.

BACKGROUND

Software programs and products are continuously evolving and becoming more complex as they are required to provide ever more functionality, scale for large deployments, improve performance and basically provide more advanced and comprehensive solutions.

One of the most prominent paths for scaling systems and services to provide such demanding needs is distribute computing in which software applications may be jointly executed by a distributed system comprising a plurality of computing nodes, for example, servers, network nodes and/or the like communicating with each other.

Provisions, frameworks, protocols and services developed and deployed to support the joint execution are also constantly evolving and advancing to provide improved joint execution and communication services to the computing nodes. One such framework is the Microservices Architecture (MSA). Following the introduction of the microservices applications which were previously monolithic by design and deployment could be divided into smaller code segments, specifically microservices which are each capable of providing a given functionality of an entire service. Due to its loosely coupled implementation and ability to communicate with each other, the microservices are highly efficient for decoupling development and deployment of software applications. The microservices may be further deployed in containers to make them agnostic to the hardware platform on which they are executed thus making them highly suitable for deployment in distributed systems potentially comprising different hardware processing elements.

One of the major challenges with software applications development and deployment is the ability to identify and isolate root cause(s) of anomalies and failures detected during the execution of the application. Along with the constantly growing complexity of the software applications, Root Cause Analysis (RCA) applied to identify the root cause naturally also becomes significantly more complex and more resource demanding.

Both the importance and complexity of the RCA are dramatically intensified for the distributed systems in which the application may be executed in parallel by a plurality of computing nodes. This is because while, due to their distributed nature, the distributed systems are significantly more susceptible to anomalies and failures, tracking and analyzing the distributed and simultaneous execution of the application significantly increases the RCA challenge.

SUMMARY

Embodiments of the disclosure provide solutions which mitigates or solves the drawbacks and problems of conventional solutions.

The above and further embodiments are the subject matter of certain independent claims. Further advantageous embodiments can be found in the dependent claims.

In some embodiments, the disclosure aims at providing a solution for identifying a root cause of anomalies detected during execution of an application executed jointly by a plurality of computing nodes in a distributed system, in particular an application executed by computing nodes which utilize microservices for the joint execution.

According to a first aspect of the present disclosure there is provided a system for identifying a root cause of anomalies in executing an application, the application comprising a plurality of operations. The system comprising a processing circuitry comprising:

A preprocessing module configured to receive tracing data, comprising a plurality of tracing spans. Each tracing span documenting, for a corresponding operation of the application, a plurality of properties and corresponding values.

A signal splitting module configured to group the plurality of tracing spans in a plurality of groups such that each of the plurality of groups comprises operations with identical properties and corresponding values.

An anomaly detection module configured to determine anomalous operations for each of the plurality of tracing data spans.

A scoring module configured to calculate a plurality of anomaly scores each anomaly score indicating a level of anomaly within each one of the plurality of groups.

A root cause identification module configured to analyze the plurality of anomaly scores and to identify a root cause of the detected anomalies according to the analysis of the plurality of anomaly scores.

According to a second aspect of the present disclosure there is provided a method for identifying a root cause of a fault in executing an application, comprising:

Receiving tracing data, comprising a plurality of tracing spans. Each tracing span documenting, for a corresponding operation of the application, a plurality of properties and corresponding values.

Grouping the plurality of tracing spans in a plurality of groups such that each of the plurality of groups comprises operations with identical properties and corresponding values.

Determining anomalous operations for each of the plurality of tracing data spans.

Calculating a plurality of anomaly scores each anomaly score indicating a level of anomaly within each one of the plurality of groups.

Analyzing the plurality of anomaly scores and to identify a root cause of the detected anomalies according to the analysis of the plurality of anomaly scores.

According to a third aspect of the present disclosure there is provided a computer program with a program code for performing a method as described in the second aspect of the present disclosure.

According to a fourth aspect of the present disclosure there is provided a computer readable storage medium comprising computer program code instructions, being executable by a computer, for a method as described in the second aspect of the present disclosure.

Inferring the root cause from the anomaly scores computed for properties and corresponding values recorded for the application execution may enable identification of the root cause with no prior knowledge of the nature, workings and/or execution flows of the of application and/or executing system. In addition, the anomaly scores based root cause identification is basically oblivious to the components, interdependencies, system metrics, health indicators and/or any other execution parameter of the executing system and/or the executed application thus making the anomaly scores based root cause identification highly scalable as it may be easily deployed for identifying the root cause of anomalies detected in practically any system capable of generating the tracing data. Moreover due to its independence of the actual workings of the system and the application, the anomaly scores based root cause identification requires little and potentially no customization for each system and/or each application for deploying it in diverse system architectures executing diverse and potentially highly complex applications. Furthermore, the anomaly scores based root cause identification employs standard and currently available anomaly detection algorithm(s) thus avoiding the need to devise new means for detecting the anomalies.

In an optional implementation form of the first, second, third and/or fourth aspects, the system includes a tracing module configured to generate the tracing spans, wherein the tracing module comprises a tracing library and a plurality of tracing servers. The tracing library being configured to generate one tracing span for each operation processed by the application and transmit the tracing span to one or more of the plurality of tracing servers. Wherein the tracing servers are configured to collect the received tracing spans and transmit them to the processing circuitry.

The anomaly scores based root cause identification relies exclusively on the tracing data typically available in currently existing systems employing microservices such that simply deploying a tracing module for collecting the tracing data requires there is no additional effort and/or resources for developing and/or deploying means to collect and/or produce additional system and/or application information.

In a further implementation form of the first, second, third and/or fourth aspects, the root cause analysis module is configured to:
  for each property:
    Compute a plurality of aggregated anomaly scores, for each property value, over the anomalies of all groups with the same property value.
    Compute a standard deviation in the plurality of aggregated anomaly scores.
    Select one or more properties with the standard deviation exceeding a threshold.
  Wherein the root cause is identified according to one or more of the selected properties and the property value having the maximal aggregated anomaly score.

Employing the standard deviation for estimating and/or identifying the probable (likely) root cause may allow for a simple while significantly accurate estimation requiring significantly low computing resources since the anomaly scores may be simply grouped and aggregated per property value. As expected a property value presenting high deviation form a mean value computed for the all properties and all property values is highly probable to be the root cause for the detected anomalies. Moreover, the standard deviation based root cause estimation does not require rules for inferring the root cause thus significantly reducing the effort and resources required for development and/or deployment since such rules may require significant effort to develop and adapt per system and/or per application.

In a further implementation form of the first, second, third and/or fourth aspects, the root cause analysis module is configured to:
  Compute a distance metric indicating distances between all pairs of property values.
  Apply a clustering algorithm on the plurality of property values using the distance metric to obtain a plurality of clusters of property values.
  Compute a plurality of anomaly scores each for one of the plurality of clusters.
  Select one or more clusters according to the plurality of anomaly scores and a threshold.
  Wherein the root cause is identified according to one or more of the selected clusters.

In a further implementation form of the first, second, third and/or fourth aspects, the root cause analysis module is configured to compute the distance metric by:
  Constructing a graph $G=(V, E)$, with vertices V and edges E. Wherein V comprises vertices representing the plurality of property values and the plurality of groups of tracing spans and E comprising edges between vertices representing the plurality of property values and the plurality of groups of tracing spans and edge capacities based on the group anomaly scores.
  Computing a plurality of maximum flow values between pairs of vertices representing the plurality of property values.
  Computing a plurality of distances between all vertices representing the plurality of property values from the plurality of maximum flow values.
  Obtaining the distance metric from the plurality of distances.

In a further implementation form of the first, second, third and/or fourth aspects, each distance of the plurality of distances of pairs of property values is:
  inverse proportional to the anomaly score of a corresponding group of tracing spans, or zero when both property values are the same, or
  inverse proportional to the number of groups of tracing spans with non-zero anomaly score.

Employing the clustering based root cause detection for estimating and/or identifying the probable (likely) root cause may allow for an accurate estimation which is based on metrics computed independently of the executing system and/or the application thus requiring no metrics specific to the system and/or the application. This may be highly advantages since there is no need for customization to adapt to specific system and/or application metrics thus making the clustering based root cause highly scalable, portable and adoptable. Moreover, using the metrics generated based solely on the anomaly scores computed for the tracing spans may allow high correlation between the metrics and the anomaly scores and hence with the estimated root cause. This is in contrast to metrics which may be inherently available for the executing system and/or the executed application which may be may often be insufficient for accurately correlating the metrics with the detected anomalies let alone for correlating the metrics with a probable root cause.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 9A and FIG. 9B are schematic illustrations of exemplary graphs constructed for exemplary tracing spans generated during execution of an application executed jointly by a plurality of computing nodes to produce distance metrics used for clustering, according to some embodiments of the present disclosure.

DETAILED DESCRIPTION

Figure 1:
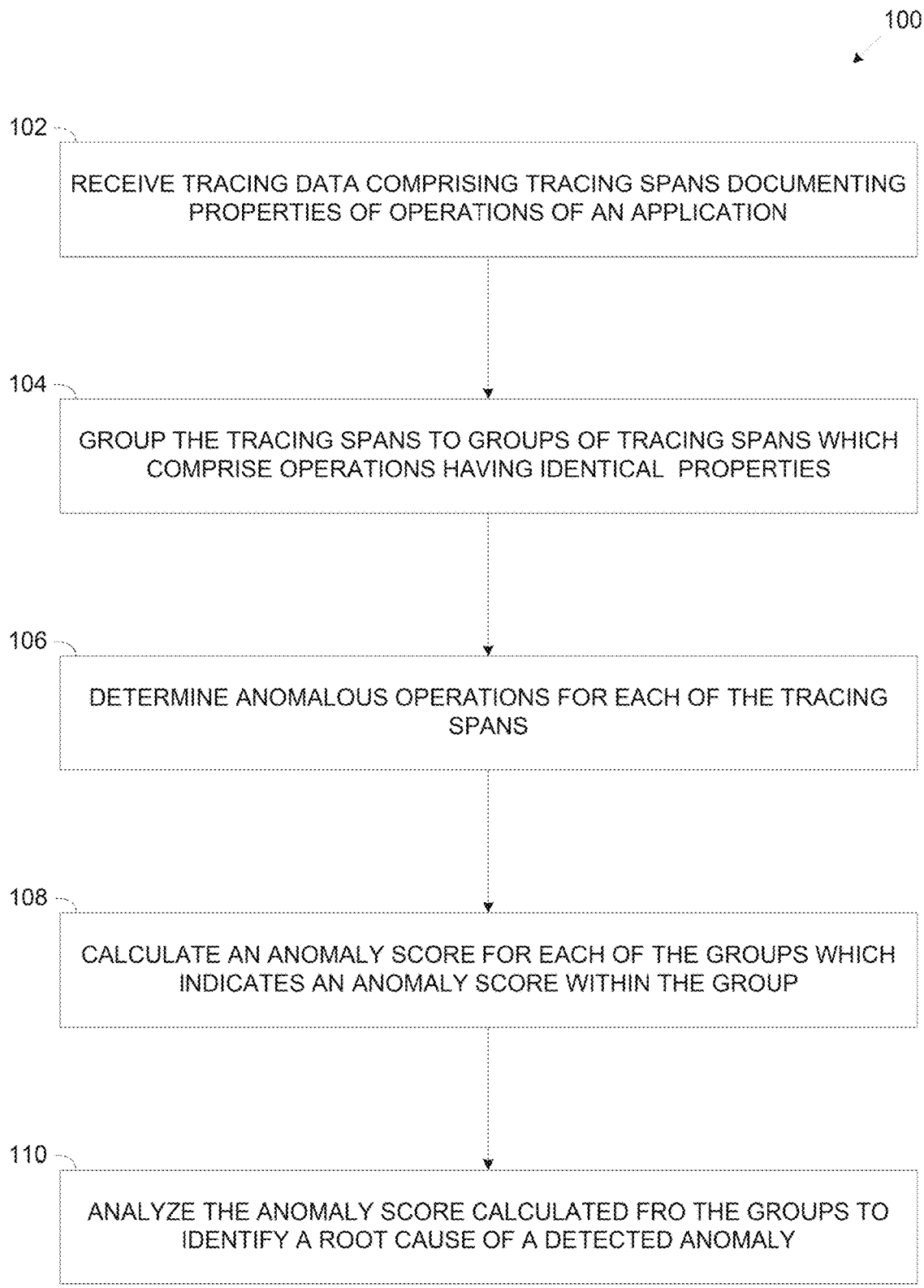
FIG. 1 is a flowchart of an exemplary process of identifying a root cause of anomalies in execution of an application executed jointly by a plurality of computing nodes, according to some embodiments of the present disclosure.

The present disclosure, in some embodiments thereof, relates to identifying a root cause of anomalies in an execution of an application and, more specifically, but not exclusively, to identifying a root cause of anomalies an execution of an application executed jointly by a plurality of computing nodes of a distributed system.

According to some embodiments of the present disclosure, there are provided methods, systems and computer program products for identifying a root cause of anomalies detected during execution of an application, in particular an application executed jointly by a plurality of computing nodes in a distributed system. Moreover, the application may be constructed of multiple functional components encapsulated into loosely-coupled modular microservices deployed at the computing nodes to simplify application development and maintenance.

The root cause of the detected anomalies may be identified by a Root Cause Analysis (RCA) system applying the RCA based on tracing data generated at the plurality of computing nodes during the distributed execution of the application. The tracing data may be available in currently existing distributed systems by instrumenting the microservices to support, provide and/or generate the tracing data.

The tracing data may comprise a plurality of tracing spans (observations) which document system and/or application properties corresponding to operations of the application executed at the plurality of computing nodes. Each tracing span therefore corresponds to a respective operation of the application and may document (depict, capture) the properties and their corresponding values as captured for the respective operation.

The properties may include one or more categorical properties which are discrete-valued properties encoding a type of an operation documented by the corresponding tracing span and a system component involved in the operation. The properties may further include one or more behavioral properties, for example, timing properties and/or the like which may be arbitrarily-valued properties capturing aspects of the behavior of the distributed system, the operation and/or a component of the application. These behavioral properties may be later used to detect anomalies by establishing whether the respective tracing span which documents the behavioral property(s) corresponds to a normal or anomalous operation. The properties may also include one or more other properties which are not relevant for characterizing the type of the tracing spans nor for establishing whether or not the respective tracing span corresponds to a normal or anomalous operation. These other properties may include, for example, unique properties such as, for example, one or more identifiers (IDs) of traces, processes, variables and/or the like.

It should be stressed that the RCA system has no knowledge regarding the distributed system including interdependencies between different types of tracing spans. The RCA system is also oblivious to the mechanisms that could cause anomalies. As such, the information available to the RCA system is limited to the properties and their assigned values as documented by the tracing spans and the classification of the tracing spans as corresponding to normal operations or anomalous operations.

In order to enable the analysis of similar subsets of tracing spans, the tracing spans may be grouped in a plurality of groups by tracing span type such that each group includes tracing spans comprising identical properties and possibly identical values assignments to the properties. Optionally, the tracing spans within each group may be temporally organized to produce time series groups in which the tracing spans are ordered in a timeline according to their time of generation and hence time of capture of their property value(s).

The anomalies detected during the distributed execution may be identified by one or more anomaly detection methods, algorithms and/or tools (collectively designated anomaly detection algorithms) as known in the art and are not within the scope of the present disclosure. These anomaly detection algorithm(s) may be applied to the tracing spans, optionally to the groups of tracing spans to identify the anomalies, i.e. anomalous operations in the distributed execution of the application. The outcome of this anomaly detection algorithm(s) may typically include a classification of each of the tracing spans as corresponding to a normal operation or to an anomalous operation. As stated the RCA system may be completely agnostic to the selection of the anomaly detection algorithm(s) and only requires the classification outcome received from the anomaly detection algorithm(s).

The RCA system may calculate an anomaly score for each of the groups of tracing spans according to the classification of the tracing spans included in the group to quantify the extent to which the group deviates from normal execution of the distributed application. The anomaly score is therefore indicative of the level of anomaly within the respective group. The RCA system may employ different scoring functions to map the anomaly level for each of the tracing spans and groups. In particular, the RCA system may use one or more scoring functions which are based on the partitioning outcome received from the anomaly detection algorithm(s), for example as a ratio and/or a fraction of the normal and anomalous tracing spans with respect to the overall tracing spans.

The RCA system may then apply one or more methods, techniques and/or algorithms to analyze the plurality of anomaly scores computed for groups to identify one or more components of the distributed system and/or of the application which are probable (likely) to be at least part and/or relate to the root cause of the anomalies detected by the anomaly detection algorithm(s). The analysis of the anomaly scores is done only with respect to the properties documented in the tracing spans. As such, no further information about the distributed system and the application nor any information about the nature of the anomalies detected by the anomaly detection algorithm(s) are required for the analysis.

The RCA system may follow several approaches and methods for conducting the analysis to identify the probable root cause(s) as described in detail herein after.

A first approach may be based on aggregating the anomaly scores of tracing spans of each group per property value thus identifying a normal distribution of each property (single-property) documented by the tracing span and computing a standard deviation of each property from the normal distribution. The standard deviation may be compared to a certain threshold predefined and/or adjusted for the distrusted system for which the RCA is applied. The root cause may then be mapped to the single-property value with maximal aggregated anomaly score assigned to the property having a standard deviation exceeding the threshold. In case there are several properties for which the standard deviation exceeds the threshold, the root cause may be mapped to a set of single-property values with maximal anomaly score for each property having a standard deviation exceeding the threshold.

In another approach, the analysis may be based on clustering the single-property values as documented by the tracing spans to clusters. One or more clustering techniques as known in the art may be applied to produce the clusters using distance metrics derived from the tracing spans, specifically from the properties and corresponding values documented by the tracing spans coupled with their anomaly scores. After the single-property values are clustered, an overall anomaly score may be computed for each of the clusters and compared to a certain threshold predefined and/or adjusted for the distrusted system for which the RCA is applied. The root cause may then be mapped to the cluster presenting highest anomaly score.

The RCA based on analysis of anomaly scores computed for groups of tracing spans corresponding to operations performed during the distributed execution of the application by the plurality of computing nodes may present major advantages and benefits compared to the exiting RCA methods and systems.

The anomaly scores based RCA identifies the root cause by inferring the root cause from the properties and corresponding values coupled with their classification as corresponding to normal or anomalous operations without using any further information relating to the distributed system, to the application and/or the nature of the anomalies detected during the distributed execution of the application. In addition, the anomaly scores based RCA is basically oblivious to the components, interdependencies, system metrics, health indicators and/or any other execution parameter of the distributed system and/or the application thus making the anomaly scores based RCA highly scalable as it may be easily deployed for identifying the root cause of anomalies detected in practically any distributed system capable of generating the tracing data.

Moreover due to its independence of the actual workings of the system and the application, the anomaly scores based RCA requires no extensive customization for each distributed system and/or each application executed jointly by the distributed system thus significantly reducing the development effort and/or resources required for deploying the anomaly scores based RCA in diverse distributed system architectures jointly executing diverse and potentially highly complex application.

Furthermore, as the anomaly scores based RCA relies exclusively on the tracing data typically available in currently existing distributed systems employing microservices there is no need for developing and/or deploying means to collect additional system and/or application information. This may significantly reduce development and/or deployment effort and resources while significantly increasing scalability and ease of integration and adoption of the anomaly scores based RCA.

In addition, the anomaly scores based RCA employs standard and currently available anomaly detection algorithm(s) thus avoiding the need to devise new means for detecting the anomalies during the distributed execution of the application. This may further reduce development and/or deployment effort and resources.

Some of the existing RCA systems may rely on formal inference rules to identify and determine probable root cause(s) for anomalies detected during execution of the application. Since the distributed system as well as the application may be highly complex comprising an extremely large number of components, execution flows, interdependencies and/or the like, the set of such inference rules may need to be highly exhaustive to map all these aspects to respective possible root causes. The inference rule based RCA may therefore require extensive development effort and/or resources. The inference rule based RCA may also require specific customization for each distributed system and/or each application executed jointly in the distributed system thus significantly reducing the scalability of the inference rule based RCA.

In contrast, as the anomaly scores based RCA does not rely on inference rules, the anomaly scores based RCA may require significantly reduced development and/or deployment resources and may be highly more scalable compared to the inference rule based RCA.

Some other RCA systems may not require formal inference rules for determining probable (likely) root cause(s) of the detected anomalies but rather rely on system metrics, indicators for system health, quality of service (QoS) and/or the like. The intuition on which such RCA systems are founded is that the system metrics may be directly correlated to the health indicators. Therefore in case of an anomaly is detected in a certain health indicator, a system and/or application component reflected by a system metric which exhibits strong correlation with the certain health indicator may be determined as a probable (likely) root cause of the detected anomaly. This system metrics based RCA approach may be limited for two main reasons. First, the health indicators required by the system metrics based RCA may not be available. In addition the tracing data generated for the distributed execution typically includes the tracing spans corresponding to operations which may involve multiple components of the system and/or application but does not contain explicit system metrics for each component of the system and/or application.

The anomaly scores based RCA on the other hand is based solely on the data available in the tracing spans and does not require health indicators or system metrics. The anomaly scores based RCA may be therefore highly suitable and easily deployed in diverse distributed systems executing jointly a wide range of application for which the health indicators and the system metrics may not be available.

Some other RCA systems may use system metrics for determining probable (likely) root cause(s) of the detected anomalies but may not require the system health indicators. Instead, this approach is based on the assumption that metrics are arranged in a hierarchic structure in which system metrics on higher levels are formed by aggregating metrics of lower levels. The probable root cause(s) identification is based on the assumption that the metric corresponding to the root cause of the detected anomalies exhibits a strong correlation with the anomalous metric. Since tracing spans contain behavioral properties pertaining to operations (possibly involving multiple components) and not individual components, this RCA approach may be highly limited. In addition, this RCA approach relies on metrics aggregated in hierarchic structure where the anomaly detection is only applied to top and/or higher-level metrics aggregations. As result, anomaly detection techniques may fail to detect actual anomalies in the hierarchical aggregation scheme since the effects of the anomalies may be diluted or hidden by the aggregation. Furthermore, the probable root cause(s) identification relies on correlating metrics in the hierarchy which requires the shape of metrics to be retained during the process of aggregation.

Contrary to that, the anomaly scores based RCA is free of such limitations since the anomaly scores based RCA does not require the system metrics which are typically not available in existing systems and applications. Moreover, since the anomaly scores based RCA applies no hierarchical structure for identifying the probable root cause(s) of the detected anomalies, the anomaly scores based RCA may utilize standard and commonly available anomaly detection algorithms and techniques which may be able to detect the anomalies according to the effects not obscured or hidden by the hierarchical structure.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of identifying a root cause of anomalies in execution of an application executed jointly by a plurality of computing nodes, according to some embodiments of the present disclosure. An exemplary process 100 may be executed by a root cause analysis system to identify a root cause of anomalies detected during execution of an application, in particular an application executed jointly by a plurality of computing nodes in a distributed system. Moreover, the application may be constructed of multiple functional components encapsulated into loosely-coupled modular microservices deployed at the computing nodes to simplify application development and maintenance.

The root cause is identified by applying an RCA based on tracing data generated at the plurality of computing nodes during the distributed execution of the application. The tracing data may comprise a plurality of tracing spans (observations), each documenting the execution of an operation in a system and/or application at the computing nodes. Each tracing span documents (comprises) one or more properties and respective property values which encode aspects of the execution.

In order to enable the analysis of similar subsets of tracing spans, the tracing spans may be grouped in a plurality of groups by tracing span type such that each group includes tracing spans corresponding to operations having identical properties and identical property values. The tracing spans within each group may be temporally organized to produce time series groups in which the tracing spans are ordered in a timeline according to their time of generation and hence time of capture of their property value(s).

One or more anomaly detection methods, algorithms and/or tools as known in the art may be applied to the groups of tracing spans to identify one or more anomalies, i.e. anomalous operations in the distributed execution of the application.

Furthermore, an anomaly score may be calculated for each of the groups, specifically the groups in which an anomalous operation(s) is identified to quantify the extent to which the respective group deviates from a normal execution flow of the application. As such the anomaly score is indicative of the level of anomaly within the respective group.

The root cause of the detected anomalous operation(s) may be identified based on an analysis of the plurality of anomaly scores calculated for the groups. The analysis may employ one or more techniques, methods and/or algorithms as described herein after.

Figure 2:
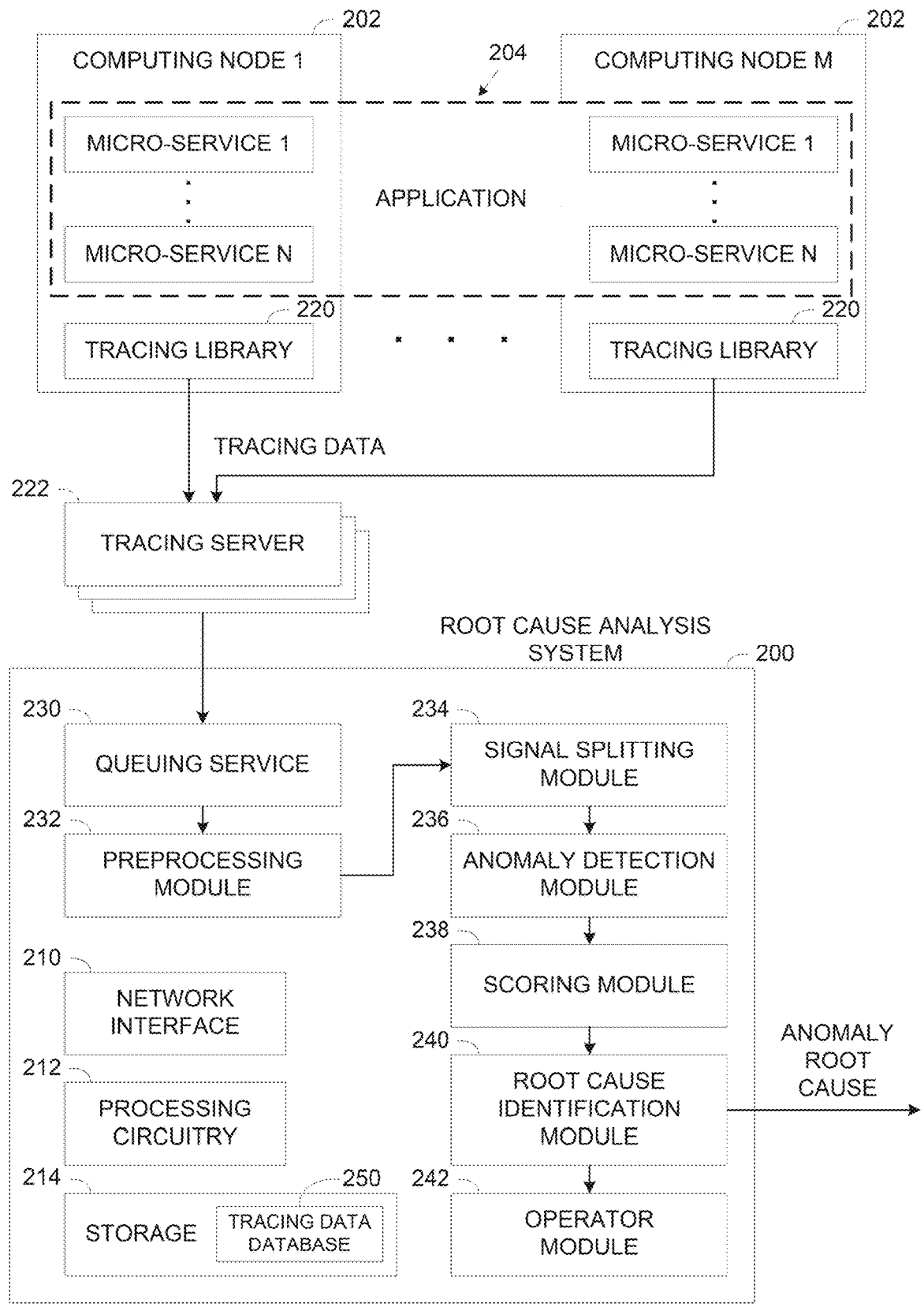
FIG. 2 is a schematic illustration of an exemplary system for identifying a root cause of anomalies in execution of an application executed jointly by a plurality of computing nodes, according to some embodiments of the present disclosure.

Reference is also made to FIG. 2, which is a schematic illustration of an exemplary system for identifying a root cause of anomalies in execution of an application executed jointly by a plurality of computing nodes, according to some embodiments of the present disclosure.

An exemplary root cause analysis (RCA) system 200, for example, a computer, a server, a computing node, a cluster of computing nodes and/or the like may execute a process such as the process 100 for identifying a probable root cause of anomalies in execution of an application 204 executed jointly by a plurality of computing nodes 202 of a distributed system such as, for example, a server, a computing node, a cluster of computing nodes, a cloud based service, a cloud based platform and/or the like.

The computing nodes 202, for example, a computing node 1 through a computing node M may typically follow a microservice based architecture comprising a plurality of microservices 1 through N for executing the application 204. The microservices may be instrumented to generate tracing data for debugging and monitoring tasks by capturing distributed executions at the computing nodes 202 as a plurality of tracing spans each documenting properties and property values of operations performed on one of the computing nodes 202 to execute, jointly, the application 204.

The instrumentation of the microservices to generate the tracing data includes a tracing library deployed on each of the computing nodes 202 to collect the tracing data and transmit it to one or more tracing servers 222 deployed to receive the tracing data and transmit (forward) it to the RCA system 200. Optionally, one or more of the tracing servers 222 are integrated and/or utilized by the RCA system 200.

The RCA system 200 may include a network interface 210 for communicating with one or more of the tracing servers 222 and/or the computing nodes 202, a processing circuitry 212 for executing the process 100 and storage 214 for storing code and/or data.

The network interface 210 may include one or more network interfaces for connecting to one or more wired and/or wireless networks, for example, a Local Area Network (LAN), a Wide Area Network (WAN), a Municipal Area Network (MAN), a cellular network, the internet and/or the like to facilitate communication with the tracing server(s) 222 and/or the computing nodes 202. Through the network interface 202, the RCA system 200 may receive the tracing data generated by the microservices deployed at the computing nodes 202.

The processing circuitry 212 may include one or more processor(s), homogenous or heterogeneous, each comprising one or more processing nodes arranged for parallel processing, as clusters and/or as one or more multi-core processor(s). The processing circuitry 212 may further include one or more hardware specific components, for example, an Application Specific Integrated Circuit (ASIC), a Field Programmable Gate Array (FPGA), a Digital Signals Processor (DSP), a Graphic Processor Unit (GPU) and/or the like to support execution of the process 100.

The storage 214 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 214 may further comprise one or more network storage resources, for example, a storage server, a Network Attached Storage (NAS), a network drive, and/or the like accessible via one or more networks through the network interface 210.

The processing circuitry 212 may execute one or more software modules, for example, a process, an application, an agent, a utility, a tool, a script, an Operating System (OS) and/or the like each comprising a plurality of program instructions stored in a non-transitory medium such as the storage 214 and executed by one or more processors such as the processing circuitry 212.

The processing circuitry 212 may execute one or more functional modules which may be implemented by one or more of the software modules, one or more of the hardware specific components and/or a combination thereof. The functional modules may include, for example, a queuing service 230, a preprocessing module 232, a signal splitting module 234, an anomaly detection module 236, a scoring module 238, a root cause identification module 240, an operator interface 242 among others.

The queuing service 230 may be configured to receive the tracing data from the tracing server(s) 222 and temporarily store (buffer) the tracing data before it is processed and analyzed. The preprocessing module 232 may be configured to adjust and/or manipulate the (observed) properties documented by the tracing spans included in the received tracing data for operations performed by the computing nodes 202 during the distributed execution of the application 204. The signal splitting module 234 may be configured to group the tracing spans according to tracing span type thus producing groups of tracing spans documenting operations having identical properties. The signal splitting module 234 may be further configured to store at least some of the tracing data, in particularly the grouped tracing spans in a tracing data database 250 which may be stored, for example, in the storage 214. The stored grouped tracing spans may be therefore available for further processing either locally at the RCA system 200 and/or remotely at one or more remote analysis resource(s) to which the tracing data may be sent.

The anomaly detection module 236 may be configured to apply to the groups of tracing spans the anomaly detection method(s), algorithm(s) and/or tool(s) (collectively designated anomaly detection algorithm herein after) as known in the art to identify the anomalous operation(s) during the distributed execution of the application 204. The scoring module 238 may be configured to calculate the anomaly scores for the properties values documented in the groups of tracing spans. The root cause identification module 240 may be configured to identify the root cause of the detected anomalous operation(s) based on analysis of the calculated anomaly scores.

The operator interface 242 may be configured to programmatically interact with one or more of the functional modules executed by the RCA system 200, for example, the anomaly detection module 236 and the cause identification module 240. The operator interface 242 may be thus configured to generate automatically one or more alerts, alarms, notifications, warnings and/or messages indicative of the identified root cause(s). The operator interface 242 may further include a user interface, for example, a command line interface, a Graphical User Interface (GUI) and/or the like to interact with one or more users. In particular, the user may issue a request via the operator interface 242 to initiate a root cause analysis to be conducted by the root cause identification module 240.

Optionally, the RCA system 200 and/or one or more of the functional modules are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 starts with the preprocessing module 232 receiving from the tracing server(s) 222 the tracing data generated by the tracing libraries 220 deployed on the computing nodes 202 jointly executing the application 204. Optionally, the tracing data may be initially received at the RCA system 200 by the queuing service 230 which may serve as a buffer for temporarily storing the received tracing spans until they may be transferred to the preprocessing module 232 for processing and/or analysis.

Before further describing the embodiments of the present disclosure, some background information, assumptions and notations are presented.

The tracing spans included in the tracing data serve as sets of observations by documenting a fixed set of properties captured during the distributed execution of the application 204 by the computing nodes 202 where, as described herein before, the application 204 is modularly constructed of multiple functional different components each utilizing one or more of the microservices 1 through N.

The properties documented in the tracing spans may be distinguished to three main types of properties:

Categorical properties which are discrete-valued properties encoding a type of an event represented by the corresponding tracing span and the system component involved in the event. The categorical properties typically encode parameters of the respective operation, for example, a type of the operation, an action done by the operation, the computing node 202 conducting the operation, components(s) of the system which are involved in execution of the operation and/or the like. The system components may include, for example, the computing node 202, the name of the microservice, a name of a subsystem within the microservice, an ID (identifier) of a rack in which the executing computing node 202 is located, a network ID if a specific one was used and/or the like.

Behavioral properties which are arbitrarily-valued properties capturing aspects of the behavior of the distributed system or component. These behavioral properties may be later used to detect anomalies by establishing whether the respective tracing span (documenting the behavioral property(s)) is normal or anomalous.

Other properties which are not relevant for characterizing the type of the tracing spans nor for establishing whether or not the respective tracing span is anomalous. These properties may include, for example, unique properties such as, for example, unique IDs assigned to each tracing span and/or each execution trace by the tracing libraries 220. These unique IDs are not directly relevant for the RCA process 100, but may be useful for other applications which are out of scope of the present disclosure.

As each tracing span corresponds to a certain operation of the application 204, the tracing span may therefore include one or more categorical properties, for example, an application, an operation name, an operation method (e.g., GET for HTTP/REST requests) and/or the like. Moreover, each tracing span is assigned a unique ID which is a unique property while the latency of the operation documented by the tracing span is a behavioral property. Each tracing span may be further assigned a timestamp of the indicating the time of generation and hence the time of capturing the property(s) value(s).

It is assumed that the properties of the tracing spans are sufficiently expressive to identify a potential cause of detected anomalies meaning that it is assumed that the root cause of detected anomalies can be attributed to one or more concrete values (assignments) of the categorical properties.

It is further assumed that the tracing spans analyzed to identify the root cause of the anomalies have the same set of categorical properties and that this set of categorical properties must not be empty. It is also assumed that for each tracing span (observation) exactly one concrete value is assigned to each categorical property of the respective tracing span.

For brevity and clarity, the following notations are used herein after.

| | |
|---|---|
| S | Set of all tracing spans. |
| P | Set of all categorical properties of each tracing span. |
| $C(p), p \in P$ | Set of valid values C that can be assigned to a property p. |
| $c \rightarrow p, p \in P, c \in C(p)$ | Assignment of value c to property p. |
| $s(c \rightarrow p), s \in S$ | Predicate on tracing span s that holds true if and only if s has the assignment of value c to property p. |
| $a = \{(c_1 \rightarrow p_1), \ldots, (c_i \rightarrow P_i)\}$ | Set of assignments of values to properties: $\forall (c_j \rightarrow p_j) \in a: p_j \in P \wedge c_j \in C(p_j)$ |

A set of assignments a is called unambiguous if and only if it contains at most one value assignment to each property:

$$\forall P \in P: |\{(c_i \rightarrow p_i) \in a | p_i = p\}| \leq 1$$

A set of assignments a is called complete if and only if it contains exactly one assignment to each property:

| | |
|---|---|
| | $\forall p \in P: |\{(c_i \rightarrow p_i) \in a \mid p_i = p\}| = 1$ |
| $A(s), s \in S$ | Complete set of assignments of tracing span s such that: $\forall (c_i \rightarrow p_i) \in A(s): s(c_i \rightarrow p_i)$ |
| $\mathcal{A}$ | Set of all complete assignments satisfied by at least one tracing span: $\mathcal{A} = \{A(s) | s \in S\}$ Intuitively, $\mathcal{A}$ corresponds to all tracing span types present in the set of tracing spans S. |

An unambiguous observation s satisfies a set of assignments a if and only if $a \subseteq A(s)$. For brevity, the predicate $s(\bullet)$ is extended to sets of assignments as follows:

For a tracing span s, $s \in S$ and a set of assignments a, the predicate s(a) holds true if and only if $a \subseteq A(s)$.

| | |
|---|---|
| $S_a$ | Subset of tracing spans satisfying the set of assignments a: $S_a = \{s \in S \mid s(a)\}$. It should be noted that $S_\emptyset = S$. |

It should be noted that from the definition of $\mathcal{A}$ it immediately follows that the number of tracing span types cannot exceed the number of tracing spans since each tracing span has exactly one tracing span type: $|\mathcal{A}| \leq |S|$.

Figure 3:
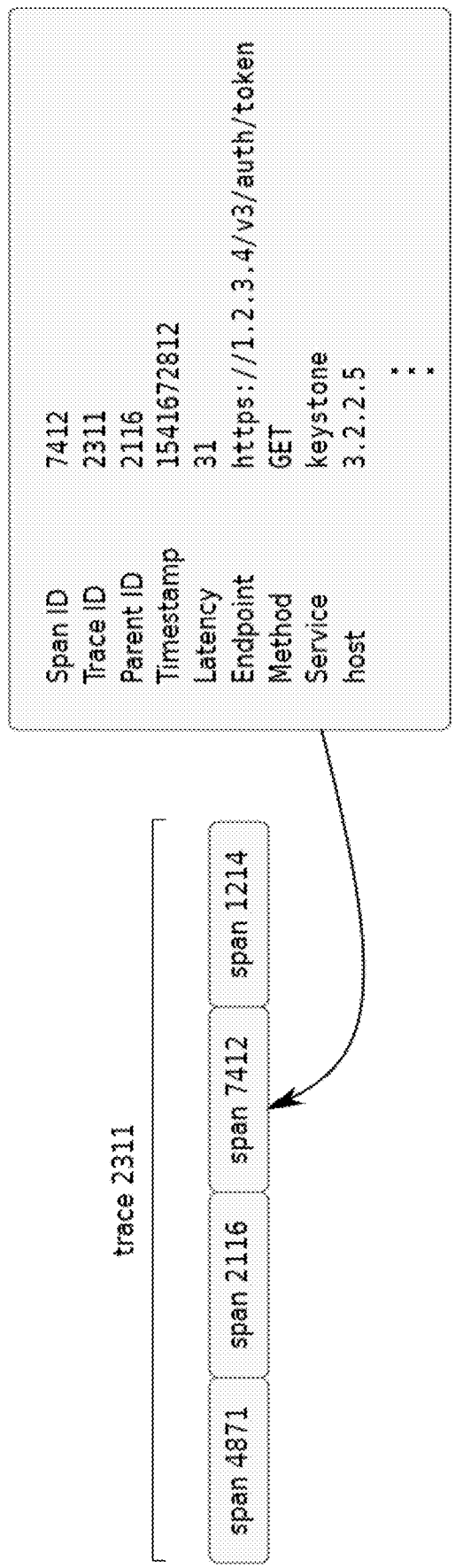
FIG. 3 is a schematic illustration of an exemplary tracing span.

Reference is now made to FIG. 3, which is a schematic illustration of an exemplary tracing span. A microservice-based distributed system comprising a plurality of computing nodes such as the computing nodes 202 may be instrumented to generate the tracing data. As such each of the microservices such as the microservices 1 through N may be instrumented with a tracing library such as the tracing library 220 which may intercept the communication between the microservice and its client microservices. The tracing library 220 is configured to generate one tracing span (record) for each request processed to capture the specific microservice function invoked, the timing, the parameters, and other function-specific information. In addition, each tracing span (record) may contain references to its parent tracing span and/or to the overall execution trace that the respective tracing span belongs to.

As seen in FIG. 3 depicts an exemplary tracing span. A parent tracing span $s_1$ of a tracing span $s_2$ represents the last request (if any) during which a nested request (represented by $s_2$) was issued. Hence, in the example depicted in FIG. 3, tracing span 7412 is nested within tracing span 2116. A trace is a set of tracing spans which all share the same trace ID and together represent a distributed execution, possibly involving multiple different microservices of the microservices 1 through N.

Each tracing span generated by each of the tracing libraries 220 may be transmitted to the tracing server(s) 222 which is responsible for collecting the tracing data, i.e., the tracing spans (tracing span records) from the instrumented microservices.

Figure 4:
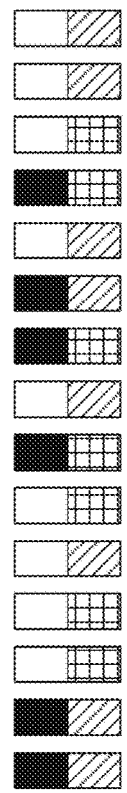
FIG. 4 is a schematic illustration of exemplary tracing spans generated during execution of an exemplary application executed jointly by a plurality of computing nodes and documenting exemplary property values, according to some embodiments of the present disclosure.
Figure 4:
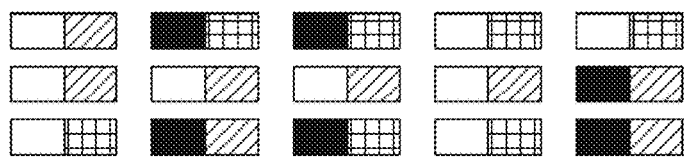

Reference is now made to FIG. 4, which is a schematic illustration of exemplary tracing spans generated during execution of an exemplary application executed jointly by a plurality of computing nodes and documenting exemplary property values, according to some embodiments of the present disclosure.

A table 402 comprises a plurality of operations, specifically 15 operations which were recorded during execution of an exemplary application such as the application 204 executed by a plurality of computing nodes such as the computing nodes 202. Specifically, the exemplary application is executed by two computing nodes 202 each having a unique Internet Protocol (IP) address, 10.1.1.50 and 10.1.1.60.

Each tracing span generated for a respective operation of the application by a tracing library such as the tracing library 220 may document single property values assigned to respective properties documented by the tracing span corresponding to the respective operation. The properties may include, for example, a unique ID (other) property, a microservice name categorical property, a host IP address categorical property of the respective computing node 202 and a latency time behavioral property. Each of the tracing spans therefore includes property values for each of the two categorical properties as presented to the right of each entry of the table 402. The set S therefore includes all the tracing spans generated for the operations (requests) listed in the table 402.

After receiving the tracing data, the preprocessing module 232 may adjust and/or manipulate one or more of the tracing spans to prepare the tracing spans for the subsequent processing and analysis stages in the RCA system 200. Specifically, the preprocessing module 232 is configured to sanitize and clean the property values assignments of the tracing spans. In particular, some of the properties may contain unique identifiers which may obscure important characteristics of the operations documented by the tracing spans. Therefore, in order to simplify the processing steps of the subsequent modules of the RCA system 200, the preprocessing module 232 may remove or replace the IDs, for example, IP addresses, server IDs, client IDs and/or the like from the property values assignments in case these IDs are not relevant for the respective property.

For example, assuming two operations executed in a certain microservice are http://1.1.1.1/user_details?user=X and http://5.5.5.5/user_details?user=Y in which the same operation user_details?user= is directed to two different users X and Y and where the same operation is executed at different computing nodes 202 (hosts) 1.1.1.1 and 5.5.5.5. Assuming only the type of the operation is required for the process 100, the unique identifiers, i.e., the specific user names and the specific host names inside the URL strings may obscure the information that both operations refer to the same operation. In such case, the preprocessing module 232 may replace the unique identifiers to produce a more generic representation of the operation, for example, http://HOST/user_details?user=USER. As such, when analyzed (at a later stage of the process 100) the two operations may be easily identified as directed to the same operation and may be grouped and/or classified accordingly.

In another example, referring to the tracing span depicted in FIG. 3, the endpoint URL contains the IP address 1.2.3.4 of the host (computing node 202) to which the request was issued. However, the functionality that was requested by the application 204 is defined by the microservice name keystone, the method GET and the URL without host IP address https://_IP_/v3/auth/token. That is, the type of request does not depend on the specific host IP address 1.2.3.4 to which the request is issued. In such case, the preprocessing module 232 may determine that the IP address 1.2.3.4 is not relevant in the endpoint property since the endpoint is used to identify the functionality requested and may therefore remove the IP address 1.2.3.4 from the endpoint property. However, with respect to the host property, the preprocessing module 232 may determine that the IP address 3.2.2.5 is relevant for identifying the host computing node 202 and may therefore not alter the value of the host property.

After the preprocessing module 232 cleans the property value assignments from unique ID(s) determined irrelevant for the respective property, each resulting tracing span may comprise the categorical property(s), for example, endpoint URL, method, service name, host name and/or the like, the behavioral property(s), for example, the operation latency and/or the like and the timestamp of the operation documented by the tracing span.

The preprocessing module 232 may further sort the plurality of tracing spans in an ordered timeline according to their timestamps.

Reference is made once again to FIG. 1.

As shown at 104, the signal splitting module 234 receives the tracing spans from the preprocessing module 232 and groups them into groups according to the tracing span types such that the tracing spans may be comparable within each group. In particular, the signal splitting module 234 groups (partitions) the set S of tracing spans according to their tracing span type such that all tracing spans grouped together within the same group correspond to operations having identical property value assignments for the categorical properties. This may be formally expressed as shown in Equation 1 below.

$$\bigcup_{a \in \mathcal{A}} S_a = S \qquad \text{Equation 1}$$

It should be noted that each set of values (assignments) a in the formula above is complete and unambiguous according to the definition of $a \in \mathcal{A}$, and hence a tracing span type.

For grouping the set S of tracing spans, the signal splitting module 234 may analyze each of the tracing spans and examine the value assignment to each property resulting in $O(|S| \cdot |P|)$ steps in the worst case. It should be noted that the computational cost, i.e., the computation resources utilization for grouping (partitioning) the tracing spans, as stated above, may coincide with the cost for generating the tracing spans in the first place. In such case the process of grouping the tracing spans may be considered to asymptotically not impose any additional cost.

Optionally, the signal splitting module 234 is further configured to store at least some of the tracing data in the tracing data database 250. In particular, the signal splitting module 234 may store the grouped tracing spans comprising the tracing spans arranged and ordered in the time series to form a timeline according to their timestamps.

While storing the tracing data is not strictly required for the RCA process 100, the stored tracing data may be useful for many purposes and objectives. For example, assuming that a severe problem is detected in the distributed system, using the tracing data stored prior to the detected problem, an RCA may be initiated immediately. In another example, some anomaly detection techniques may rely on changes visible in the tracing data. Such changes may include, for instance, the latency increasing when a problem occurs. Applying such change reliant anomaly detection techniques on the tracing data stored prior to the problem detection may allow detecting such latency changes which may be no longer visible after the problem occurs and the latency may be constantly high.

As shown at 106, the anomaly detection module 236 receives the grouped tracing spans from the signal splitting module 234 and applies one or more of the anomaly detection algorithms to the groups of tracing spans to identify anomalous operations which may have occurred during the distributed execution of the application 204.

The anomaly detection module 236 may employ the anomaly detection algorithm(s) as known in the art and is therefore regarded as black box within the context of the present disclosure. As such, minimal assumptions are made with respect to these anomaly detection algorithms.

The anomaly detection algorithm(s) applied by the anomaly detection module 236 may typically receive the set S of tracing spans, in particular the set S partitioned to the plurality of tracing spans groups and partitions the groups into normal groups reflecting (documenting) normal operations and anomalous documenting anomalous operations. It is assumed that for a set of tracing spans $S_a$, the anomaly detection algorithm(s) classifies (partitions) the set of tracing spans $S_a$ into $S_a^A$ and $S_a^N$ such that $S_a = S_a^A \cup S_a^N \wedge S_a^A \cap S_a^N = \emptyset$, where $S_a^A$ denotes the subset of tracing spans corresponding to operations classified as anomalous operations and $S_a^N$ denotes the subset of tracing spans corresponding to operations classified as normal operations.

The anomaly detection algorithm(s) may accept one or more additional input parameters, for example, a training set of tracing spans for calibration, an algorithm-specific parameter and/or the like. However, for the sake of simplicity, it is assumed that any anomaly detection algorithm applied by the anomaly detection module 236 is encapsulated in a wrapper function to obey the interface described above, if necessary.

As shown at 108, the scoring module 238 receives the groups of tracing spans and calculates an anomaly score for each of the groups. In particular, the scoring module 238 calculates the anomaly score for each of the groups according to the partitioning (classification) identified by the anomaly detection module 236 to the normal and anomalous tracing spans contained in the respective group.

The calculated anomaly score may be indicative of the level of anomaly within each group of tracing spans thus quantifying the extent to which the tracing spans of each tracing span group (type) deviate from normal. The anomaly score may therefore be calculated using one or more scoring functions that map the outcome (partitioning) of the anomaly detection module 236 for tracing spans of each tracing span group (type) to a scalar value ranging from 0 to 1. Expressed intuitively, the anomaly score corresponds to the notion of "how anomalous" the tracing spans of a given tracing span group (type) are classified. As such the scoring function(s) applied by the scoring module 238 to derive the anomaly scores from the anomaly detection result (partitioning) are monotonically increasing with regard to the number of tracing spans included in the anomalous groups classified as corresponding to anomalous operations.

The scoring function(s) employed by the scoring module 238 may include a plurality of mapping functions and the operation of the scoring module 238 is not limited to any specific such mapping function(s). The main impact and effect of the exact mapping function(s) selection may be on runtime cost, i.e. utilization of computation resources for calculating the anomaly scores. For simplicity and brevity, the scoring module 238 applies a scoring function which is based on an anomalous fraction of the tracing spans classified as anomalous from the overall tracing spans. The anomaly scoring function $R(S_a)$ used for computing the anomaly score of a certain set (group) $S_a$ of tracing spans of type a is utilized as the fraction $S_a^A$ of tracing spans of the set $S_a$ that were classified as anomalous divided by the overall tracing spans in the set $S_a$ which is the sum of the tracing spans $S_a^A$ classified as anomalous and the tracing spans $S_a^N$ classified as normal. This anomaly scoring function $R(S_a)$ is expressed in equation 2 below.

$$R(S_a) = \frac{|S_a^A|}{|S_a^A + S_a^N|} = \frac{|S_a^A|}{|S_a|} \qquad \text{Equation 2}$$

It should be noted that the this definition only pertains to complete sets of tracing spans characterized by a tracing span type (group) a, and in particular, it does not apply to sets of tracing spans $S_{a'}$ where a' is not a tracing span type (group), i.e., the set a' is not a complete and unambiguous set of single-property value assignments. For the scoring function $R(\bullet)$ a complementary scoring function $R'(\bullet)$ is defined that is valid for arbitrary and not necessarily complete unambiguous sets of value assignments as expressed in equation 3 below.

$$R'(S_a) = \sum_{a' \in \mathcal{A}, a \subseteq a'} \frac{|S_{a'}|}{|S_a|} \cdot R(S_{a'}) \qquad \text{Equation 3}$$

Intuitively, the complementary scoring function $R'(S_{a'})$ degenerates to the scoring function $R(S_{a'})$ if a' is a tracing span type, i.e., a group. In case a' is an incomplete and unambiguous set of value assignments, the complementary scoring function $R'(S_a)$ may compute an aggregated anomaly score for the set $S_a$ based on the anomaly scores calculated for the sets $S_{a'}$, $a' \in \mathcal{A}$, $a \subseteq a'$.

The computation of the complementary scoring function $R'(S_a)$ may not require additional invocations of the anomaly detection algorithm(s) to the set of tracing spans $S_a$ as it may rely only on the anomaly scores calculated for the tracing span groups (types) $a' \in \mathcal{A}$, $a \subseteq a'$.

In the special case of the complementary scoring function $R'(S_{a'})$ where $|a'|=1$, i.e., a' contains only a single property value assignment, the computation of e complementary scoring function $R'(S_{a'})$ may be conducted with low additional asymptotic cost. This is because the anomaly detection algorithm(s) needs to be at least invoked for all tracing spans of each group (tracing span type) and therefore at least $O(|\mathcal{A}|)$ steps need to be performed for the computation of scoring function $R(\bullet)$. At the same time, the results of the anomaly detection module 236 may be aggregated for each values assignment a' at the expense of |P| additional steps per group (tracing span type). After that, the computation of the complementary scoring function $R'(S_{a'})$ may require only constant time.

Since the scoring functions $R(\bullet)$ and $R'(\bullet)$ based on the anomalous fraction may be applied to efficiently calculate the aggregated anomaly scores without re-invoking the anomaly detection algorithm(s) which may typically be high computation resources consuming, using these scoring functions may be an effective selection. However, this should not be construed as limiting since as described herein before, other scoring functions may be applied by the scoring module 238 to calculate the anomaly scores.

As shown at 110, based on the anomaly scores calculated by the scoring module 238, the root cause identification module 240 may infer a probable (likely) root cause of the anomalous operation(s) detected by the anomaly detection module 236. The root cause identification module 240 may further output one or more alerts, alarms, notifications, indications and/or messages indicating the identified root cause(s) and optionally a probability level of these identified root cause(s) being actual root cause(s).

Figure 5:
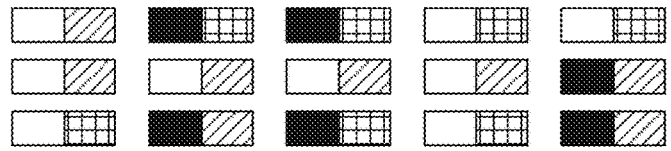
FIG. 5 is a schematic illustration of an exemplary sequence for identifying a root cause of anomalies detected in execution of an exemplary application executed jointly by a plurality of computing nodes based on tracing spans generated during execution of the application and documenting exemplary property values, according to some embodiments of the present disclosure.
Figure 5:
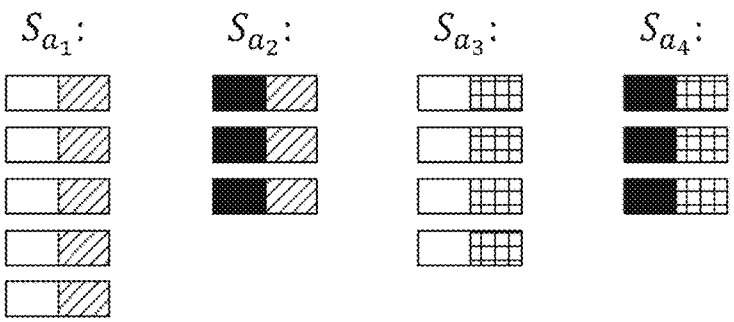
Figure 5:
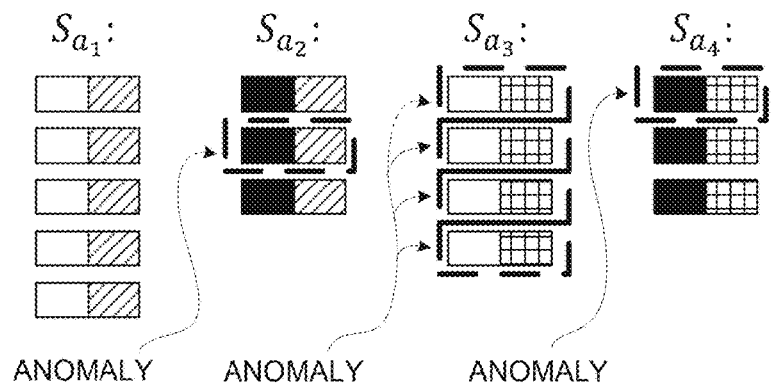

Reference is now made to FIG. 5, which is a schematic illustration of an exemplary sequence for identifying a root cause of anomalies detected in execution of an exemplary application executed jointly by a plurality of computing nodes based on tracing spans generated during execution of the application and documenting exemplary property values, according to some embodiments of the present disclosure.

As shown at 502, the exemplary set S of tracing spans generated for the operations (requests) listed in the table 402 presented in FIG. 4 may be received by a preprocessing module such as the preprocessing module 232 which may process the tracing spans of the set S as described in step 102 of the process 100.

As shown at 504, a signal splitting module such as the signal splitting module 234 may group the tracing spans of the set S to a plurality of groups (tracing span types) $S_{a_1}$, $S_{a_2}$, $S_{a_3}$ and $S_{a_4}$ each comprising tracing spans having identical value assignments to their properties, specifically to their categorical properties as described in step 104 of the process 100.

As shown at 506, an anomaly detection module such as the anomaly detection module 236 may apply one or more of the anomaly detection algorithms to classify the operations documented by the tracing spans of the set S and identify one or more anomalous operations based on analysis of the tracing spans as described in step 106 of the process 100. In this example, the anomaly detection module 236 may determine that the tracing spans documenting the operations listed in entries 3, 4, 6, 10, 12 and 13 in the table 402 are anomalous operations while the other operations listed in the table 402 are normal operations.

As shown at 508, a scoring module such as the scoring module 238 may apply one or more of the scoring functions to calculate the anomaly score for each of the groups (types) of tracing spans as described in step 108 of the process 100. In this example, the scoring module 238 may apply the anomalous fraction based scoring function R(•) to calculate the anomaly scores for the groups (tracing span types) $S_{a_1}$, $S_{a_2}$, $S_{a_3}$ and $S_{a_4}$ which results are $R(S_{a_1})=0.0$, $R(S_{a_2})=0.333$, $R(S_{a_3})=1.0$ and $R(S_{a_4})=0.333$.

As shown at 510, a root cause identification module such as the root cause identification module 240 may analyze the anomaly scores calculated by the scoring as described in step 110 of the process 100 to identify one or more probable root causes for the anomalous operation(s) detected by anomaly detection module 236.

It is assumed that the root cause identification module 240 has no knowledge regarding the distributed system including interdependencies between different types of tracing spans, nor the mechanisms that could cause anomalies. As such, the only information available to the root cause identification module 240 is limited to the properties documented by the tracing spans and their classification as corresponding to normal operations or anomalous operations.

The root cause of the detected anomalous operations (anomalies) may be traced to a set of single-property value assignments that may explain the detected anomalies.

A notation $B^s$ denotes the set of all single-property assignments satisfied by any tracing span such that $B^s=\{c\rightarrow p|\exists s\in S:s(c\rightarrow p)\}$. The root cause of the detected anomalous operations may thus be a non-empty subset of $B^s$. It should be noted that $|B^s|$ is bounded by the cumulative number of possible values that can be assigned to each property such that $|B^s|\leq\Sigma_{p\in P}|C(p)|$.

The root cause identification module 240 may apply several methods for analyzing the anomaly scores in order to identify the probable root causes for the anomalous operation(s).

In a first exemplary embodiment, the root cause identification module 240 may use a deviation-based technique in which the anomaly scores calculated for single property values of the each property may be aggregated and a standard deviation may be computed for the aggregated anomaly scores. The root cause identification module 240 may compare the computed standard deviation of each property to a certain threshold. Among the properties having their standard deviation exceeding the threshold, the root cause identification module 240 may identify the respective value to each such property having maximal aggregated anomaly score as a value which is probable (likely) to be part of the root cause of the detected anomalous operations.

Figure 6:
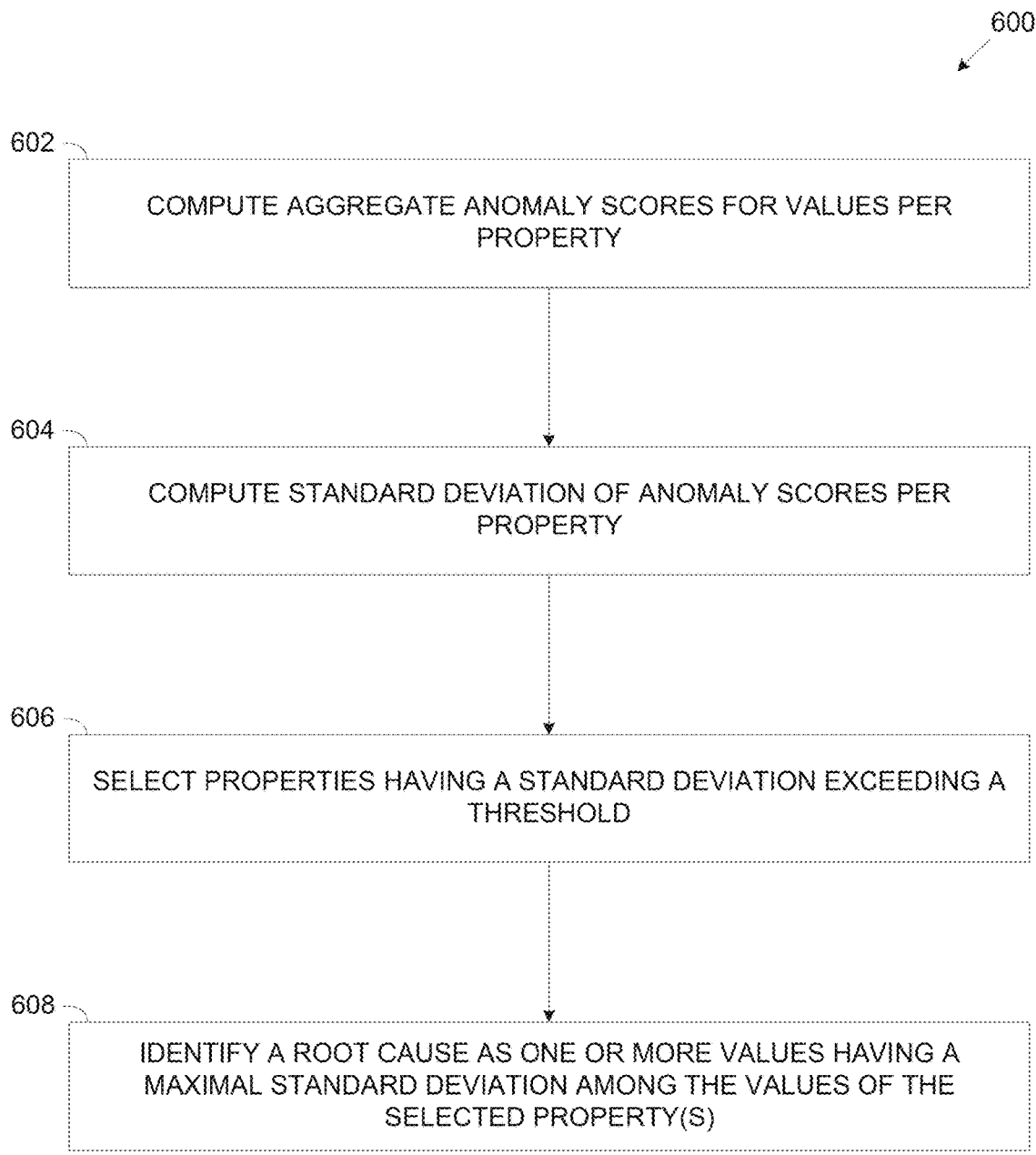
FIG. 6 is a flowchart of an exemplary process of identifying a root cause of anomalies in execution of an application executed jointly by a plurality of computing nodes based on standard deviation of anomaly scores computed for property values documented by tracing spans, according to some embodiments of the present disclosure.

Reference is now made to FIG. 6, which is a flowchart of an exemplary process of identifying a root cause of anomalies in execution of an application executed jointly by a plurality of computing nodes based on standard deviation of anomaly scores computed for property values documented by tracing spans, according to some embodiments of the present disclosure. A root cause identification module such as the root cause identification module 240 may execute an exemplary process 600 which is deviation-based to analyze the anomaly scores calculated by a scoring module such as the scoring module 238 in order to identify one or more probable (likely) root causes for the anomalous operation(s) identified by an anomaly detection module such as the anomaly detection module 236.

The intuition on which the deviation-based root cause identification is based is as follows. Assuming a values assignment $c\rightarrow p$, $p\in P$, $c\in C(p)$ is part of the root cause of a certain detected anomalous operation. In such case the anomaly scores calculated for the tracing spans $S_{\{c\rightarrow p\}}$ should significantly differ from the anomaly scores calculated for the tracing spans $\{S_{\{c'\rightarrow p\}}|c'\in C(p), c'\neq c\}$ where c' is a values assignment which is not part of the root cause of a certain detected anomalous operation. Hence, the standard deviation of the anomaly scores of the subsets of observations $\{S_{\{c'\rightarrow p\}}|c'\in C(p)\}$ should be high. In contrast, if none of the value assignments to a certain property p' is part of the root cause, then the anomaly scores for the subsets of tracing spans $\{S_{\{c'\rightarrow p'\}}|c'\in C(p')\}$ should be substantially similar since the values assignment to property p' should not have a major impact on the detected anomalies in the certain operation.

As seen at 602, the process 600 starts with the root cause identification module 240 computing an aggregated anomaly score for the value assignments per property. For each property and for each possible value assignment to the respective property, the root cause identification module 240 may retrieve the corresponding anomaly score calculated for the respective value. The root cause identification module 240 may then calculate the aggregated anomaly score for the property based on the anomaly scores of all tracing spans satisfying each possible (valid) property value assignment.

As seen at 604, the root cause identification module 240 may compute the standard deviation of the aggregated anomaly scores of each of the properties.

As seen at 606, the root cause identification module 240 compares the standard deviations computed for each of the properties to a certain threshold δ. The root cause identification module 240 may select every property having its standard deviation exceeding the threshold δ to be added to a set P* of probable properties which may potentially be relevant to the root cause, i.e. probable to be the root cause of the anomalous operation(s) detected by the anomaly detection module 236.

Optionally, prior to comparing between the standard deviations computed for the properties and the threshold δ, the root cause identification module 240 normalizes one or more of the standard deviation results to decouple the choice of the threshold δ from the overall prevalence of anomalies that may potentially change during the runtime of the system. In other words, normalizing the standard deviation results aims to make the threshold δ robust against changes of the overall prevalence of anomalies.

As seen at 608, the root cause identification module 240 identifies one or more values (assignments) of each of the property(s) in the set P* which presents the maximal aggregated anomaly score deviation as a probable root cause of the anomalous operation(s) detected by the anomaly detection module 236.

As exemplary pseudo-code excerpt 1 presents a deviation-based algorithm which may be executed by the root cause identification module 240 to perform the process 600.

Pseudo-Code Excerpt 1:

Input: threshold δ, anomaly scores for all tracing spans of each group:
  R: $\mathcal{A} \longmapsto [0,1]$
Output: probable root cause: cause $\subseteq B^S$
  1. for p ∈ P do
  2.   $D_p \leftarrow$ stddev ({R($S_{c \to p}$) | c ∈ C(p) ∧ |$S_{c \to p}$| > 0})
  3. end for
  4. P* ← {p ∈ P | $D_p$ ≥ δ}
  5. cause ← {(c → p) | p ∈ P* ∧ c ∈ C(p) $_p$ ∧ ∀c' ∈ C(p) : R(c → p)
≥
  R(c' → p)}

As seen at line 2, for each property p, the deviation-based algorithm computes the standard deviation $D_p$ over the aggregated anomaly scores for value assignments c documented in the set of tracing spans S as described in step 604 of the process 600. As seen in line 4, the deviation-based algorithm selects all properties having their standard deviation $D_p$ exceeding the threshold δ and adds them to the set P* of probable properties as described in step 606 of the process 600. As seen in line 5, the deviation-based algorithm identifies as a most probable root cause a property included in the set P* and having a maximal aggregated anomaly score among all properties included in the set P* as described in step 608 of the process 600.

Figure 7:
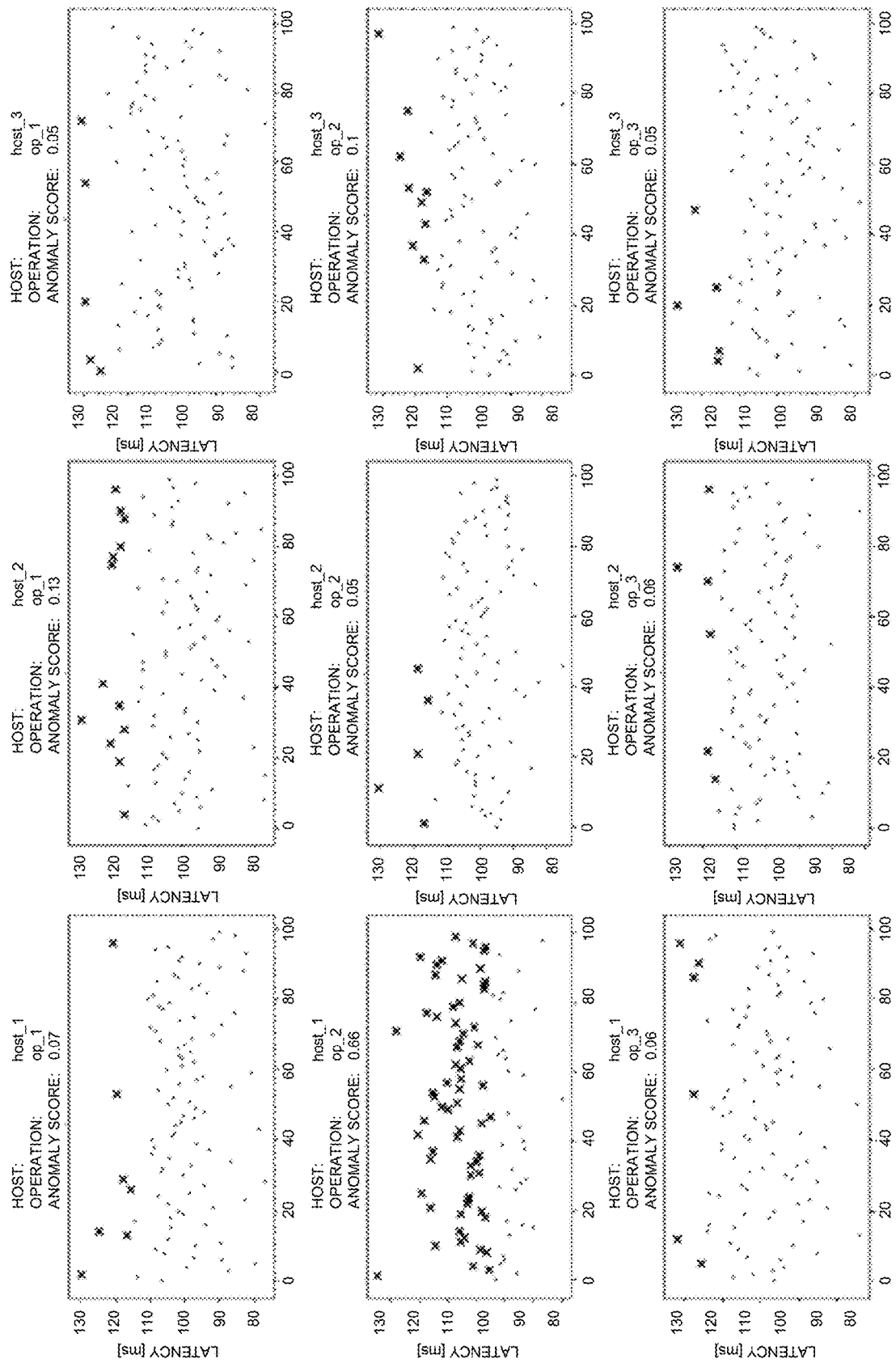
FIG. 7 presents graph charts illustrating an exemplary root cause detection of anomalies in execution of an exemplary application executed jointly by a plurality of computing nodes based on standard deviation computed for exemplary captured property values, according to some embodiments of the present disclosure.

Reference is now made to FIG. 7, which presents graph charts illustrating an exemplary root cause detection of anomalies in execution of an exemplary application executed jointly by a plurality of computing nodes based on standard deviation computed for exemplary captured property values, according to some embodiments of the present disclosure. The graph charts presented in FIG. 7 show anomaly detection results detected in a distributed system comprising a plurality of computing nodes such as the computing nodes 202 jointly executing an application such as the application 204. Specifically, there are three computing nodes 202 in the distributed system, host_1, host_2 and host_3 each executing three operations op_1, op_2 and op_3 of the application 204.

Each of the graph charts presents 100 tracing spans each documenting the operations op_1, op_2 and op_3 performed by the computing nodes 202, host_1, host_2 and host_3. Two categorical properties, namely HOST and OPERATION are defined for each of the tracing spans where each of the properties has three possible (valid) value assignments, specifically host_1, host_2, host_3 for the HOST property and op_1, op_2, op_3 for the OPERATION property.

A signal splitting module such as the signal splitting module 234 may group the tracing spans to groups (tracing span types) of tracing spans having identical property value assignments thus yielding nine groups relating to nine combinations of the value assignments of the two properties, specifically the combinations are: host_1 and op_1, host_1 and op_2, host_1 and op_3, host_2 and op_1, host_2 and op_2, host_2 and op_3, host_3 and op_1, host_3 and op_2, host_3 and op_3. Each of these combinations is presented by a respective one of the nine graph charts depicted in FIG. 7.

Each of the tracing spans may include one or more behavioral properties, specifically the latency identified for the specific operation documented by the respective tracing span. Using the value assignments of the latency property, an anomaly detection module such as the anomaly detection module 236 may classify the tracing spans to tracing spans corresponding to anomalous operations and tracing spans corresponding to normal operations. In particular, the anomaly detection module 236 may classify tracing spans assigned with high latency values as corresponding to the anomalous operations. In the graph charts the tracing spans marked with X are tracing spans corresponding to the anomalous operations while the tracing spans corresponding to the normal operations are marked with simple dots.

A scoring module such as the scoring module 238 may calculate the anomaly score for the tracing spans. The anomaly scores calculated by the scoring module 238 based on the anomalies classification (partitioning) done by the anomaly detection module 236 is presented for each of the graph charts. A root cause identification module such as the root cause identification module 240 may analyze the plurality of anomaly scores and may aggregated them for each of the groups to produce the aggregated anomaly score for each group.

For example, focusing on the HOST property, the left most column of graph charts present graph charts of three groups (sets) of tracing spans which share the same value host_1 for the HOST property while each group has a different value op_1, op2 and op_3 of the OPERATION property. The three groups host_1/op_1, host_1/op_2 and host_1/op_3 have anomaly scores 0.07, 0.66, 0.06 respectively. Since each group comprises 100 tracing spans and the anomaly scores calculated for each group is based on the fractional scoring function, there are 7, 66 and 6 tracing spans classified as anomalous in the three groups respectively. Summing the tracing spans classified as anomalous in the three groups yields a total of 79 (7+66+6=79) tracing spans classified as anomalous out of the overall 300 tracing spans included in the three groups. The root cause identification module 240 may aggregate the total tracing spans classified as anomalous in the three groups to produce the aggregated anomaly score for the single-property host_1. Using the fractional scoring function, for example, the root cause identification module 240 may divide the total number of tracing spans classified as anomalous (79) by the total number of tracing spans in the three groups (300) to produce an aggregated anomaly score of 79/300=0.26 for the value host_1 of the property HOST.

Similarly, the aggregated anomaly score computed for the value host_2 of the property HOST yields the value 0.08 and the aggregated anomaly score computed for the value host_3 of the property HOST yields the value 0.07. The standard deviation of these aggregated anomaly scores (0.26, 0.08, 0.07) is hence 0.09.

Applying the same methodology, the aggregated anomaly scores computed based on the OPERATION property yield 0.08, 0.27, and 0.06 for op_1, op_2, and op_3, respectively, resulting in a standard deviation of 0.09. Using a threshold of $\delta=0.05$, the root cause identification module 240 may determine that both properties are potentially related to the root cause of the detected anomalies. The root cause identification module 240 may therefore select the groups presenting the maximal aggregated anomaly scores for the value assignments for each property, specifically the host_1 and op_2. Hence, the root cause identification module 240 may determine that the root cause for the detected anomalies is a failure condition specific to the execution of operation op_2 by the computing node 202 host_1. As such the root cause identification module 240 may point to a specific and significantly accurate root cause for the detected anomalies. Complementary, based on the results, the root cause identification module 240 may therefore exclude the other operations, i.e. op_1 and op_3 executed by the computing node 202 host_1 as well as the operation op_2 executed by the other computing nodes 202 host_2 and host_3 from suspicion as probable (likely) to be related to the root cause. It should be noted that the smaller number of tracing spans from other groups corresponding to operations classified as anomalous classified (possibly false positives) do not impair the determination of the root cause group.

In a second exemplary embodiment, the root cause identification module 240 may use a clustering technique in which property values of multiple properties may be clustered into a clusters using distance metrics derived from the tracing spans. For each of the clusters, the root cause identification module 240 may aggregate the anomaly scores of the properties values clustered in the respective cluster and compared to a certain threshold. In case the aggregated anomaly score calculated for a certain cluster exceeds the threshold, the set of clustered values may be identified to have a high probability (likelihood) of being the root cause of the detected anomalous operation(s).

Figure 8:
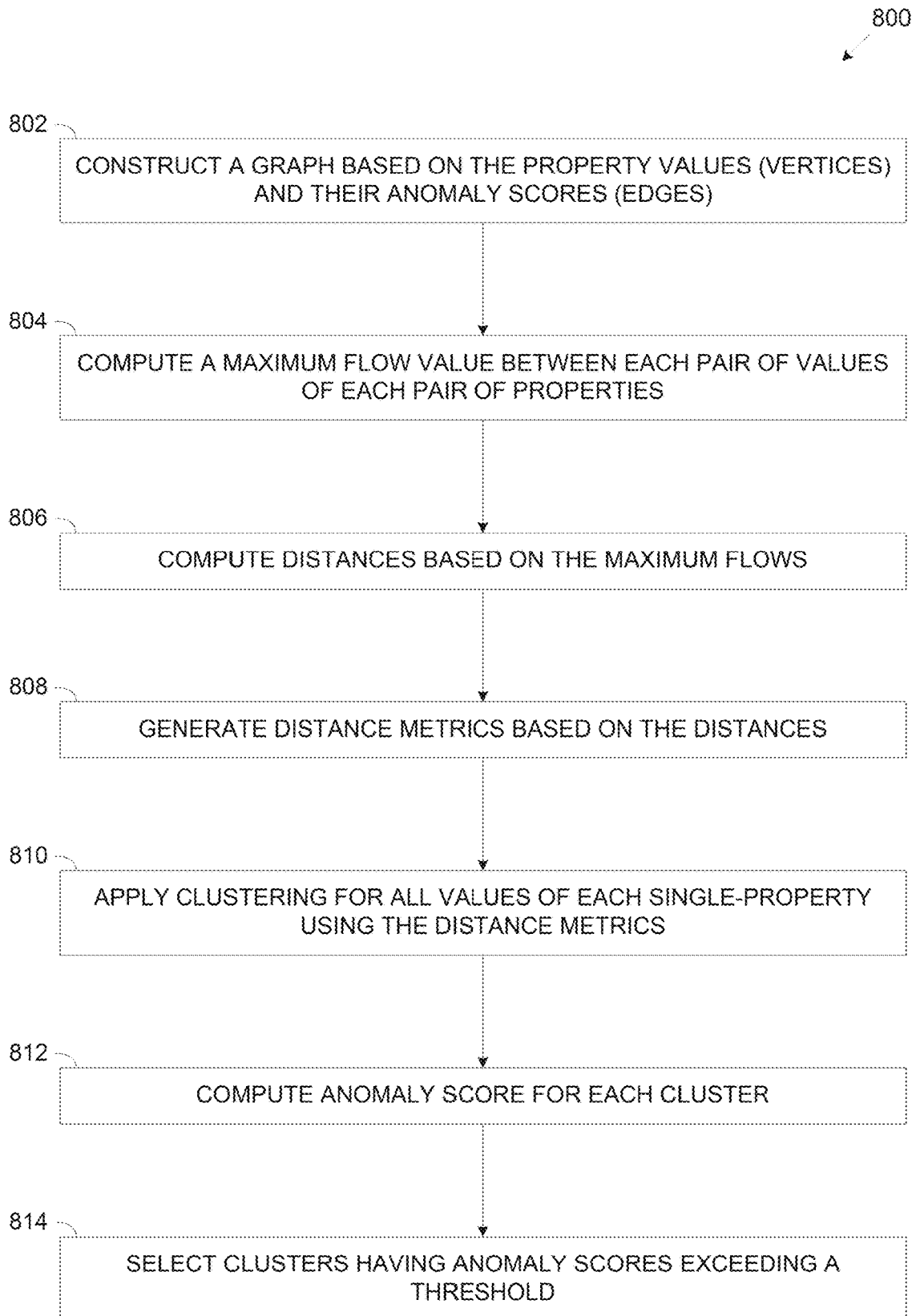
FIG. 8 is a flowchart of an exemplary process of identifying a root cause of anomalies in execution of an application executed jointly by a plurality of computing nodes based on clustering anomaly scores computed for captured property values, according to some embodiments of the present disclosure.

Reference is now made to FIG. 8, which is a flowchart of an exemplary process of identifying a root cause of anomalies in execution of an application executed jointly by a plurality of computing nodes based on clustering anomaly scores computed for captured property values, according to some embodiments of the present disclosure. A root cause identification module such as the root cause identification module 240 may execute an exemplary process 800 which is clustering-based to analyze the anomaly scores calculated by a scoring module such as the scoring module 238 in order to identify one or more probable (likely) root causes for the anomalous operation(s) identified by an anomaly detection module such as the anomaly detection module 236.

The intuition on which the clustering-based root cause identification is based is to employ one or more clustering techniques to find sets of single-property value assignments that are related to the root cause of the anomalous operations detected by an anomaly detection module such as the anomaly detection module 236. In particular, this approach aims to identify sets of single-property value assignments such that:

Two single-property value assignments are more likely to be contained in the same set if they both appear in many groups (tracing span types) which have a non-zero anomaly score, and Two single-property assignments are more likely to be contained in the same set if they both appear in groups (tracing span types) that have a higher anomaly score.

Following these assumptions, in case a resulting set (cluster) of single-property value assignments is also related to groups (tracing span types) with a high anomaly score, then the set may be considered as a root cause for these anomalous operations.

The root cause identification module 240 may apply one or more clustering methods, algorithms, techniques and/or the like as known in the art for the clustering-based root cause identification. These clustering techniques may be generic and may be selected solely according to their operational parameters, for example, availability, performance, efficiency, computation resources utilization and/or the like. The root cause identification module 240 requires the output of the clustering operation and may therefore be indifferent to the exact implementation and internal mechanisms of the clustering methods, algorithms, techniques.

However, in order to make use of such generic and existing clustering techniques for reasoning, distance metrics may need to be derived from the tracing data in order to feed the distance metric to the clustering algorithm(s) which may use the distance metric for the clustering operation to identify the sets (clusters) of single-property value assignments satisfying the two properties presented herein above.

The core technique used in the clustering-based root cause identification is therefore to derive suitable distance metrics for single-property value assignments that can be used for the clustering operation.

The distance metrics may be derived and/or construed from the tracing data, in particular from the anomaly scores calculated for the tracing spans by a scoring module such as the scoring module 238. In particular, the distance metrics may be maximum flow-based distance metrics derived from graphs constructed from the anomaly scores and the properties and their respective value assignments as documented in the tracing spans.

The root cause identification module 240 may apply two methods to derive the maximum flow-based distance metrics, the first is based on constructing a restricted graph ($G^r$) and the second is based on a full graph ($G^f$). The naming of these graphs, restricted and full, stems from the fact that the restricted graph ($G^r$) may be considered as a subgraph of the full graph ($G^f$). Both the restricted and full graphs are almost similar in structure, but may result in different worst-case run-time complexities of the algorithms employed to compute the distance metrics.

As shown at 802, the process 800 starts with the root cause identification module 240 constructing the restricted graph ($G^r$) and/or the full graph ($G^f$).

In the following description the notation ($v_1$, $v_2$) denotes a directed edge originating from a source vertex $v_1$ of the graph to destination vertex $v_2$ where the vertices represent property values assigned to the properties in the tracing spans.

The restricted graph $G^r$ may be defined as expressed in equations 4 below.

$$G^r = (V, E^r)$$

$$V = V^1 \cup V^2 \cup V^c$$

$$V^1 = \{v_a^1 | a \in B^s\}$$

$$V^2 = \{v_a^2 | a \in B^s\}$$

$$V^c = \{v_a^c | a \in \mathcal{A}\}$$

$$E^r = E^{r,1} \cup E^2$$

$$E^{r,1} = \{(v_{a_1}^1, v_{a_c}^c) | a_1 \subseteq a_c \wedge v_{a_1}^1 \in V^1 \wedge v_{a_c}^c \in V^c\}$$

$$E^2 = \{(v_{a_c}^c, v_{a_2}^2) | a_2 \subseteq a_c \wedge v_{a_c}^c \in V^c \wedge v_{a_2}^2 \in V^2\} \quad \text{Equations 4:}$$

By its definition, the restricted graph $G^r$ only contains edges from the vertices $V^1$ to $V^c$ and from $V^c$ to $V^2$. As a direct consequence, any path from $V^1$ to $V^2$ in the restricted graph $G^r$ contains exactly three vertices. As such, the length of any path between pairs of vertices, i.e. pairs of single-property value assignments of a certain property is fixed and limited. Moreover, the flow is possible only if both single property value assignments of each pair are part of the same group, i.e. of the same tracing span type. As result the computation complexity for constructing the restricted graph $G^r$ and deriving the distance metrics is significantly more simple compared to the full graph $G^f$ thus requiring significantly reduced computing resources and/or computing time.

The full graph $G^f$ may be defined as expressed in equations 5 below.

$$G^r = (V, E^f)$$

$$E^f = E^{f,1} \cup E^2$$

$$E^{f,1} = \{(v_{a_1}^1, v_{a_c}^c) | a_1 \subseteq a_c \wedge v_{a_1}^1 \in V^1 \wedge v_{a_c}^c \in V^c\} \cup \{(v_{a_c}^c, v_{a_1}^1) | a_1 \subseteq a_c \wedge v_{a_1}^1 \in V^1 \wedge v_{a_c}^c \in V^c\} \quad \text{Equations 5:}$$

As seen, the full graph $G^f$ is defined with the same set of vertices as the restricted graph $G^r$ and also contains all edges contained in the restricted graph $G^r$. In addition, the full graph $G^f$ contains edges in both directions, i.e., including back edges between the vertices $V^1$ and $V^c$. In contrast to the restricted graph $G^r$, these additional edges potentially enable paths from the vertices $V^1$ to the vertices $V^2$ which contain more than three (unique) vertices since the path from the vertices $V^1$ to the vertices $V^2$ may contain a sub-path alternating between the vertices $V^1$ and $V^c$. As such, the full graph $G^f$ may contain all paths between pairs of vertices $V^1$ and $V^2$, i.e. between pairs of single-property value assignments comprising the fixed paths defined by the restricted graph $G^r$ and additional paths of variable length. Moreover, the full graph $G^f$ allows flows between all pairs of single-property value assignments transitively connected by a "contained in anomalous group (tracing span type)". That is, if for a sequence of single-property value assignments $a_1, \ldots, a_n$, each pair of single-property assignments $a_i, a_{i+1}$ with $1 \leq i < n-1$ is contained in an anomalous group, then there is a flow from $v_{a_1}^1$ to $v_{a_n}^2$ in $G^f$. However, while the full graph $G^f$ may support generation of more accurate distance metrics, constructing the full graph $G^f$ and computing the maximum flow from the full graph $G^f$ may require increased computing resources and/or computing time.

For both the restricted graph $G^r$ and the full graph $G^f$, edge capacities $f(v_1, v_2)$ may be assigned as expressed in equations 6 below.

$$\forall (v_{a_1}^1, v_{a_c}^c) \in E^{r,1} \cap E^{f,1} : f(v_{a_1}^1, v_{a_c}^c) = R(S_{a_c})$$

$$\forall (v_{a_c}^c, v_{a_2}^2) \in E^2 : f(v_{a_c}^c, v_{a_2}^2) = R(S_{a_c}) \quad \text{Equations 6:}$$

The edge capacities for edges only contained in the full graph $G^f$ are assigned analogously as expressed in equation 7 below.

$$\forall (v_{a_c}^c, v_{a_1}^1) \in E^{f,1} \setminus E^{r,1} : f(v_{a_1}^1, v_{a_c}^c) = R(S_{a_c}). \quad \text{Equation 7:}$$

Figure 9B:
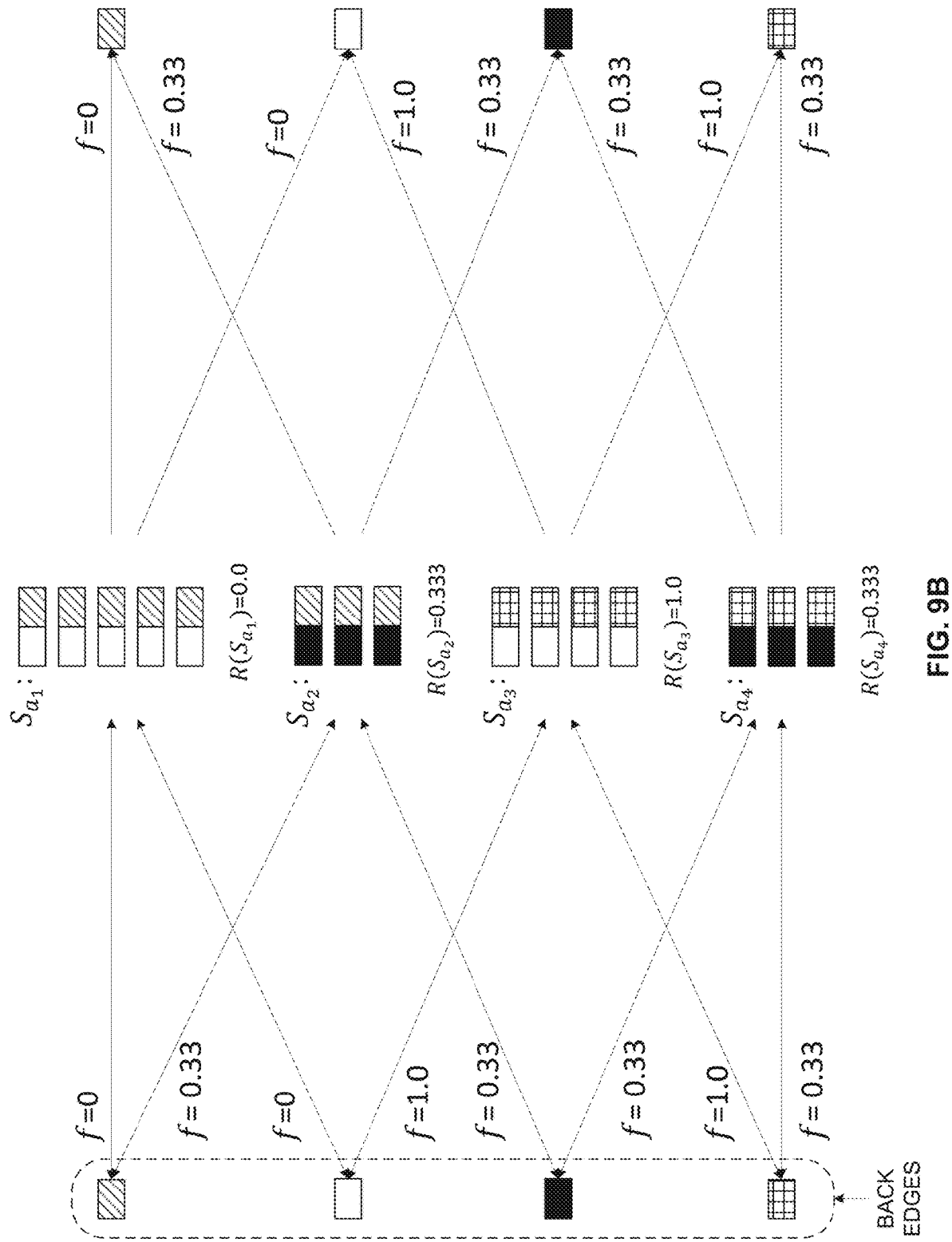

FIG. 9A and FIG. 9B are schematic illustrations of exemplary graphs constructed for exemplary tracing spans generated during execution of an application executed jointly by a plurality of computing nodes to produce distance metrics used for clustering, according to some embodiments of the present disclosure. FIG. 9A depicts a restricted graph such as the restricted graph $G^r$ constructed for an exemplary set S of tracing spans presented in FIG. 4. FIG. 9B depicts a full graph such as the restricted graph $G^f$ constructed for the exemplary set S of tracing spans presented in FIG. 4.

Reference is made once again to FIG. 8.

As shown at 804, the root cause identification module 240 computes a maximum flow between each pair of value assignments of each of the single-properties, i.e., a maximum flow, between the vertices $V^1$ and $V^2$ each representing a different single-property value assignment of the respective pair.

The two different single-property value assignments may be designated $a_1$ and $a_2$ such that $a_1 \neq a_2$. Let $v_{a_1 1}$ and $v_{a_1}^2$ denote the vertices in $V^1$ and $V^2$ representing these single-property assignments, $a_1$ and $a_2$ respectively. The root cause identification module 240 may compute the maximum flow MF from $v_{a_1}^1$ to $v_{a_2}^2$ in either the restricted graph $G^r$ and/or in the full graph $G^f$ with edge capacities f. The two maximum flows are denoted it as $MF_{G^r,f}(v_{a_1}^1, v_{a_2}^2)$ and $MF_{G^f,f}(v_{a_1}^1, v_{a_2}^2)$, respectively.

As shown at 806, based on the maximum flows in either the restricted graph $G^r$ or in the full graph $G^f$, the root cause identification module 240 may compute (define) distances d' between pairs of the single-property value assignments as expressed in equations 8 below.

$$d'(a_1, a_2) = \begin{cases} 0 & \text{if } a_1 = a_2 \\ 1/MF_{G,f}(v_{a_1}^1, v_{a_2}^2) & \text{if } a_1 \neq a_2 \wedge MF_{G,f}(v_{a_1}^1, v_{a_2}^2) > 0 \\ \infty & \text{else} \end{cases} \quad \text{Equations 8}$$

Where the notation G is set to $G^r$ for the restricted graph or to $G^f$ for the full graph.

As shown at 808, the root cause identification module 240 may generate (obtain) the distance metrics from the distances d' since the distances d' as is may not necessarily constitute a distance metric. In order to obtain the distance metrics from the distances d' the root cause identification module 240 may adjust the distances defined by d' to satisfy the triangle inequality. For example, the root cause identification module 240 may compute shortest paths between all pairs of single-property value assignments using Floyd's algorithm, yielding the distances d that formally constitute a distance metric.

After generating the distance metrics, the root cause identification module 240 may apply the clustering algorithm(s) using the obtained distance metrics to cluster the single-property values (assignments) documented by the tracing spans to a plurality of clusters (sets).

As shown at 810, the root cause identification module 240 may apply the clustering algorithm(s) to all the single-property values of all single-properties using the distance metrics obtained by the maximum flow computation over the restricted graph $G^r$ and/or the full graph $G^f$.

The outcome of the clustering algorithm(s) using the distance metrics d may include partitioning of the tracing spans to a plurality of clusters (sets) $H_1, \ldots, H_m$ of single-property value assignments $B^s$ as expressed by the equation 9 below.

$$B^s = \bigcup_{1 \leq j \leq m} H_j \qquad \text{Equation 9}$$

$$\forall\, 1 \leq i \leq m, 1 \leq j \leq m\colon H_i \cap H_j \neq \emptyset \Leftrightarrow i = j$$

In cases where the clustering algorithm(s) does not produce a partitioning as defined above, the outcome may be transformed into a plurality of partitions as follows:
- If, for each single-property value assignment, the partitioning algorithm produces a continuous score indicating a probability of membership to each cluster, then partitioning may be inferred by assigning each single-property value assignment to a cluster with maximal score.
- If a single-property value assignment is not classified to belong to any of the clusters, the single-property value assignment may be considered a singleton cluster.

Naturally, these operations for producing the clusters, if required, depend on the selection of the clustering algorithm(s).

As shown at 812, the root cause identification module 240 may compute an anomaly score for each of the clusters. This may be essential since because each single-property value assignment is contained in one cluster, it is possible that not all clusters correspond to root causes for the anomalies detected by the anomaly detection module 234. Therefore, in order to identify the clusters which represent root causes for the detected anomalies, the root cause identification module 240 may assign an anomaly score to each cluster which indicates the relevance of the contained single-property value assignments for the detected anomalies.

The root cause identification module 240 may apply one or more methods, techniques and/or algorithms for computing the anomaly scores for the clusters based on one or more characteristics of each cluster.

For example, the root cause identification module 240 may compute an anomaly score that aims to yield high values for clusters containing single-property value assignments associated to groups (tracing span types) having a high anomaly score. An exemplary scoring function $R^{*1}$ for clusters may therefore be expressed in equation 10 below.

$$\forall H_i, 1 \leq i \leq m\colon R^{*1}(H_i) = \frac{1}{|H_i|} \sum_{a \in H_i} R(S_a). \qquad \text{Equation 10}$$

For each cluster, the root cause identification module 240 may apply the scoring function $R^{*1}$ to compute an anomaly score averaging the anomaly scores of all single-property value assignments contained in the respective cluster. Hence, clusters containing single-property value assignments with high aggregated anomaly scores will yield a high overall anomaly score when computed using the scoring function $R^{*1}$.

In another example, the root cause identification module 240 may compute an anomaly score which is defined to assess an impact (i.e. effect, outcome) of a root cause that each single-property value assignments in each cluster corresponds to. As such, the overall fraction of the anomalous tracing spans that can be possibly explained by the root cause that each single-property assignments in each cluster corresponds to. An exemplary scoring function $R^{*2}$ for clusters may therefore be expressed in equation 11 below.

$$\forall H_i, 1 \leq i \leq m\colon R^{*2}(H_i) = \frac{1}{|S|} \sum_{a \in \mathcal{A}\colon a \subseteq H_i} R(S_a) \cdot |S_a|. \qquad \text{Equation 11}$$

The scoring function $R^{*2}$ may therefore yield a higher anomaly score for clusters corresponding to likely root causes that can explain more detected anomalies in the tracing spans.

As shown at 814, the root cause identification module 240 may compare the anomaly scores computed for the clusters (using the scoring functions $R^{*1}$, $R^{*2}$, or both) to a certain threshold and select clusters having an anomaly score exceeding the threshold. Optionally, in case both scoring functions are used, a different threshold may be used for selecting the clusters by comparing their anomaly scores computed by each scoring function with the respective threshold.

The root cause identification module 240 may identify as the root cause the single-property value assignments contained in the cluster having an anomaly score exceeding the threshold. Moreover, in case the root cause identification module 240 identifies several clusters having their anomaly score exceeding the threshold, the root cause identification module 240 may identify as the root cause the single-property value assignments contained in the cluster having the highest anomaly score.

An exemplary pseudo-code excerpt 2 below may be applied by the root cause identification module 240 to execute the process 800.

Pseudo-Code Excerpt 2:

---

Input: anomaly scores for all tracing spans of each group: R: $\mathcal{A} \longmapsto [0,1]$
Output: probable root cause: cause $\subseteq B^S$
1. Compute distance metric $d(a_1,a_2)$ on pairs of single property value assignments
2. Find clusters of single property value assignments based on the distance metric d
3. Compute anomaly score for each cluster
4. Report clusters with anomaly score exceeding a threshold as probable root cause

---

It is expected that during the life of a patent maturing from this application many relevant systems, methods and computer programs will be developed and the scope of the term anomaly detection algorithm is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A system for identifying a root cause of anomalies in executing an application, the application comprising a plurality of operations, the system comprising:
   a processing circuitry and a non-transitory storage, wherein the non-transitory storage is configured to store code, and the processing circuitry is configured to execute the code to:
      receive tracing data, comprising a plurality of tracing spans, each tracing span documenting for a corresponding operation of the application a plurality of properties and corresponding values;
      group the plurality of tracing spans in a plurality of groups such that each of the plurality of groups comprises operations with identical properties and corresponding values;
      determine anomalous operations for each of the plurality of tracing data spans;
      calculate a plurality of anomaly scores each anomaly score indicating a level of anomaly within each one of the plurality of groups; and
      analyze the plurality of anomaly scores and to identify a root cause of the detected anomalies according to the analysis of the plurality of anomaly scores.

2. The system of claim 1, wherein the processing circuitry is further configured to execute the code to generate the tracing spans, wherein the system further comprises a tracing library, and a plurality of tracing servers,
   the tracing library being configured to:
      generate one tracing span for each operation processed by the application; and
      transmit the tracing span to at least one of the plurality of tracing servers,
      wherein the tracing servers are configured to collect the received tracing spans and to transmit them to the processing circuitry.

3. The system of claim 1, wherein the processing circuitry is configured to execute the code to:
   for each of the plurality of properties:
      compute a plurality of aggregated anomaly scores, for each property value, over the anomalies of all groups with the same property value;
      compute a standard deviation in the plurality of aggregated anomaly scores; and
      select at least one property with the standard deviation exceeding a threshold;
   wherein the root cause is identified according to the selected at least one property and the property value having the maximal aggregated anomaly score.

4. The system of claim 1, wherein the processing circuitry is configured to execute the code to:
   compute a distance metric indicating distances between all pairs of property values;
   apply a clustering algorithm on the plurality of property values using the distance metric to obtain a plurality of clusters of property values;
   compute a plurality of anomaly scores each for one of the plurality of clusters; and
   select at least one cluster according to the plurality of anomaly scores and a threshold;
   wherein the root cause is identified according to the at least one selected cluster.

5. The system of claim 4, wherein the processing circuitry is configured to execute the code to compute the distance metric by:
   constructing a graph G=(V, E), with vertices V and edges E, wherein V comprises vertices representing the plurality of property values and the plurality of groups of tracing spans, and E comprising edges between vertices representing the plurality of property values and the plurality of groups of tracing spans and edge capacities based on the group anomaly scores;
   computing a plurality of maximum flow values between pairs of vertices representing the plurality of property values;
   computing a plurality of distances between all vertices representing the plurality of property values from the plurality of maximum flow values; and
   obtaining the distance metric from the plurality of distances.

6. The system of claim 4, wherein each distance of the plurality of distances of pairs of property values is one of:
  inverse proportional to the anomaly score of a corresponding group of tracing spans,
  zero when both property values are the same, or
  inverse proportional to the number of groups of tracing spans with non-zero anomaly score.

7. A method for identifying a root cause of a fault in executing an application, comprising:
  receiving tracing data, comprising a plurality of tracing spans, each tracing span documenting for a corresponding operation of the application a plurality of properties and corresponding values;
  grouping the plurality of tracing spans in a plurality of groups such that each of the plurality of groups comprises operations with identical properties and corresponding values;
  determining anomalous operations for each of the plurality of tracing data spans;
  calculating a plurality of anomaly scores, each anomaly score indicating a level of anomaly within each one of the plurality of groups; and
    analyzing the plurality of anomaly scores and to identify a root cause of the detected anomalies according to the analysis of the plurality of anomaly scores.

8. The method of claim 7, wherein further comprising:
  generating one tracing span for each operation processed by the application.

9. The method of claim 7, wherein for each property, comprising:
  computing a plurality of aggregated anomaly scores, for each property value,
  over the anomalies of all groups with the same property value;
  computing a standard deviation in the plurality of aggregated anomaly scores; and
  selecting at least one property with the standard deviation exceeding a threshold;
  wherein the root cause is identified according to the selected at least one property and the property value having the maximal aggregated anomaly score.

10. The method of claim 7, wherein comprising:
  computing a distance metric indicating distances between all pairs of property values;
  applying a clustering algorithm on the plurality of property values using the distance metric to obtain a plurality of clusters of property values;
  computing a plurality of anomaly scores each for one of the plurality of clusters; and
  selecting at least one cluster according to the plurality of anomaly scores and a threshold;
  wherein the root cause is identified according to the at least one selected cluster.

11. The method of claim 10, wherein the computing the distance metric comprising:
  constructing a graph G=(V, E), with vertices V and edges E, wherein V comprises vertices representing the plurality of property values and the plurality of groups of tracing spans, and E comprising edges between vertices representing the plurality of property values and the plurality of groups of tracing spans and edge capacities based on the group anomaly scores;
  computing a plurality of maximum flow values between pairs of vertices representing the plurality of property values;
  computing a plurality of distances between all vertices representing the plurality of property values from the plurality of maximum flow values; and
  obtaining the distance metric from the plurality of distances.

12. A non-transitory computer readable storage medium comprising computer program code instructions, being executable by a computer, for performing the following steps:
  receive tracing data, comprising a plurality of tracing spans, each tracing span documenting for a corresponding operation of the application a plurality of properties and corresponding values;
  group the plurality of tracing spans in a plurality of groups such that each of the plurality of groups comprises operations with identical properties and corresponding values;
  determine anomalous operations for each of the plurality of tracing data spans;
  calculate a plurality of anomaly scores, each anomaly score indicating a level of anomaly within each one of the plurality of groups; and
    analyze the plurality of anomaly scores and to identify a root cause of the detected anomalies according to the analysis of the plurality of anomaly scores.

13. The non-transitory computer readable storage medium of claim 12, wherein the computer program code instructions, being executable by a computer, for further performing the following steps:
  generate one tracing span for each operation processed by the application.

14. The non-transitory computer readable storage medium of claim 12, wherein the computer program code instructions, being executable by a computer, for performing the following steps:
  compute a plurality of aggregated anomaly scores, for each property value, over the anomalies of all groups with the same property value;
    compute a standard deviation in the plurality of aggregated anomaly scores; and
  select at least one property with the standard deviation exceeding a threshold; wherein the root cause is identified according to the selected at least one property and the property value having the maximal aggregated anomaly score.

15. The non-transitory computer readable storage medium of claim 12, wherein the computer program code instructions, being executable by a computer, for performing the following steps:
  compute a distance metric indicating distances between all pairs of property values;
  apply a clustering algorithm on the plurality of property values using the distance metric to obtain a plurality of clusters of property values;
  compute a plurality of anomaly scores each for one of the plurality of clusters; and
  select at least one cluster according to the plurality of anomaly scores and a threshold;
wherein the root cause is identified according to the at least one selected cluster.

16. The non-transitory computer readable storage medium of claim 15, wherein the computer program code instructions, being executable by a computer, for performing the following steps:
  construct a graph G=(V, E), with vertices V and edges E, wherein V comprises vertices representing the plurality of property values and the plurality of groups of tracing spans, and E comprising edges between vertices representing the plurality of property values and the plurality of groups of tracing spans and edge capacities based on the group anomaly scores;

compute a plurality of maximum flow values between pairs of vertices representing the plurality of property values;

compute a plurality of distances between all vertices representing the plurality of property values from the plurality of maximum flow values; and obtain the distance metric from the plurality of distances.

\* \* \* \* \*